(12) United States Patent
Bird et al.

(10) Patent No.: US 7,224,873 B2
(45) Date of Patent: May 29, 2007

(54) OPTICAL FIBRES

(75) Inventors: David Michael Bird, Bath (GB); John Mark Pottage, North East Lincolnshire (GB); Timothy Adam Birks, Bath (GB); Matthew James Banham, Bath (GB)

(73) Assignee: Crystal Fibre A/S, Birkerod (DK)

( * ) Notice: Subject to any disclaimer, the term of this patent is extended or adjusted under 35 U.S.C. 154(b) by 227 days.

(21) Appl. No.: 10/936,825

(22) Filed: Sep. 9, 2004

(65) Prior Publication Data

US 2005/0249470 A1 Nov. 10, 2005

(30) Foreign Application Priority Data

Sep. 10, 2003 (GB) ................... 0321185.1

(51) Int. Cl.
*G02B 6/02* (2006.01)
(52) U.S. Cl. ....................... 385/125; 385/147
(58) Field of Classification Search ............... 385/123, 385/124, 125, 37, 127, 128, 147
See application file for complete search history.

(56) References Cited

U.S. PATENT DOCUMENTS 6,404,966 B1 * 6/2002 Kawanishi et al. ......... 385/125

FOREIGN PATENT DOCUMENTS

| WO | 99/64903 | 12/1999 |
|---|---|---|
| WO | 00/06506 | 2/2000 |
| WO | 02/14946 | 2/2002 |
| WO | 03/052473 | 6/2003 |
| WO | 2004/083919 | 9/2004 |

OTHER PUBLICATIONS

Kennedy et al "Optical properties of a three-dimensional silicon square spiral photonic crystal" published at Photonic and Nanostructures-Fundamentals and applications, dated Jun. 4, 2003.*
Wang, et al., "Tellurite Glass: A New Candidate for Fiber Devices," Optical Materials 3, pp. 187-203, Aug. 1994.
Birks, et al., "Full 2-D Photonic Bandgaps in Silica/Air Structures," Electronic Letters, vol. 31. No. 22, pp. 1941-1942, Oct. 26, 1995.
Knight, et al., "Photonic Band Gap Guidance in Optical Fibers," Science, vol. 282, pp. 1476-1478, Nov. 20, 1998.
Cregan, et al., "Single-Mode Photonic Band Gap Guidance of Light in Air," Science, vol. 285, pp. 1537-1539, Sep. 3, 1999.

(Continued)

*Primary Examiner*—Akm Enayet Ullah
(74) *Attorney, Agent, or Firm*—Jacobson Holman PLLC

(57) ABSTRACT

Photonic crystal fibers that guide light by virtue of a photonic band gap. Fibers that are formed from materials having higher refractive indices than silica are provided using an optical waveguide including a core with a relatively low refractive index and a photonic band gap structure that can substantially confine light to the core. The structure includes elongate regions of relatively low refractive index interspersed with elongate regions of relatively high refractive index, with the band gap residing above the fifth photonic band of the band gap structure.

33 Claims, 19 Drawing Sheets

OTHER PUBLICATIONS

Nielsen, et al., "Two-Dimensional Kagomé Structure, Fundamental Hexagonal Photonic Crystal Configuration," Electronic Letters, vol. 35, No. 20, pp. 1736-1737, Sep. 30, 1999.

Broeng, et al., "Analysis of Air-Guiding Photonic Bandgap Fibers," Optics Letters, vol. 25, No. 2, pp. 96-98, Jan. 15, 2000.

Allan, et al., "Photonic Crystal Fibers: Effective -Index and Band-Gap Guidance,"Book of Photonic Crystals and Light Localization in the $21^{st}$ Century, pp. 305-320, 2001.

Litchinitser, et al., "Antiresonant Reflecting Photonic Crystal Optical Waveguides," Optics Letters, vol. 27, No. 18, pp. 1592-1594, Sep. 15, 2002.

Venkataraman, et al., "Low Loss (13dB/km) Air Core Photonic Band-Gap Fibre," Post Deadline Session 1:PD1.1, ECOC, 2002.

Rilshede, et al., "All Silica Photonic Bandgap Fiber," CLEO, Paper CTuC 5, 2003.

Riishede, et al. "A Poor Man's Approach to Modelling Micro-Structured Optical Fibers," Journal of Optics A: Pure and Applied Optics 5, pp. 534-538, 2003.

Konorov, et al. "Waveguide Modes of Electromagnetic Radiation in Hollow-Core Microstructure and Photonic-Crystal Fibers," Journal of Experimental and Theoretical Physics, vol. 96 No. 5, pp. 857-869, 2003.

Snyder et al. "Weakly Guiding Waveguides," Book of Optical Waveguide Theory, Chapman and Hall Medical, pp. 280-300, date not available.

Joannopoulos, et al., "Photonic Crystals," Appendix D of Photonic Crystals: Molding the Flow of Light, Princeton University Press, date not available.

\* cited by examiner

FIG. 9
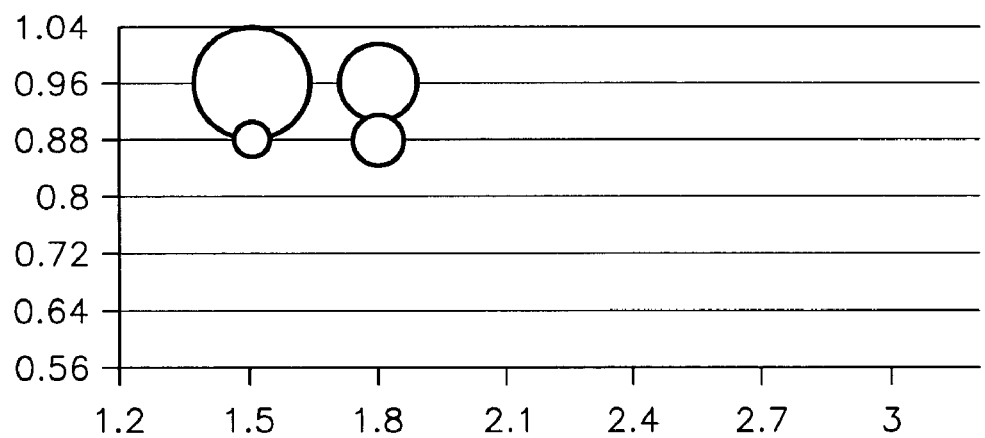
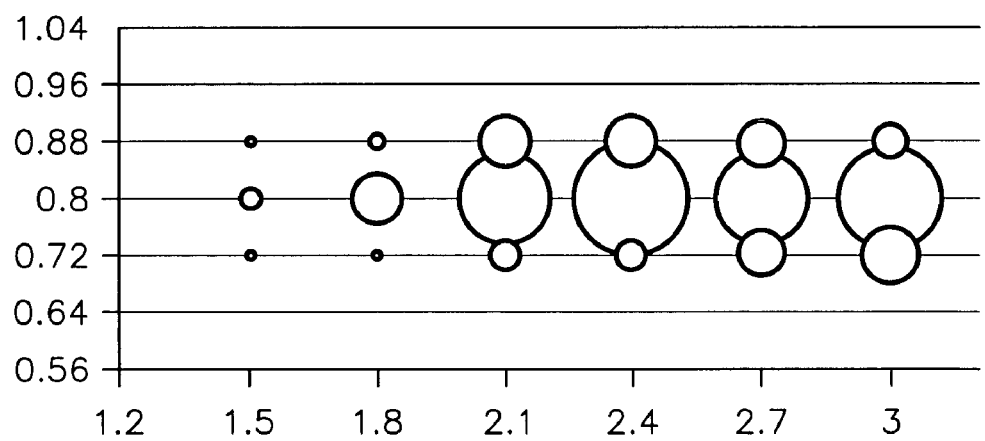

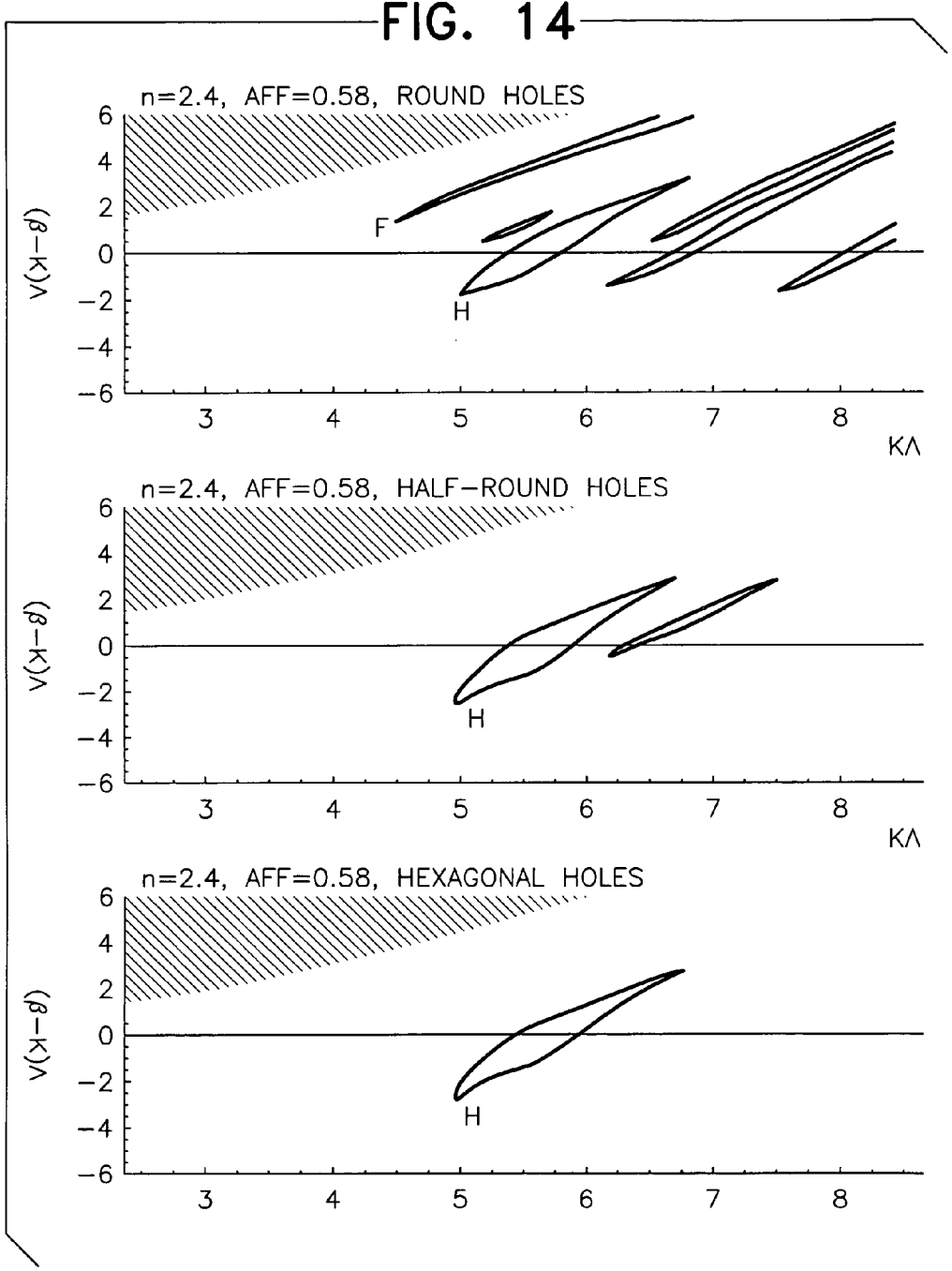

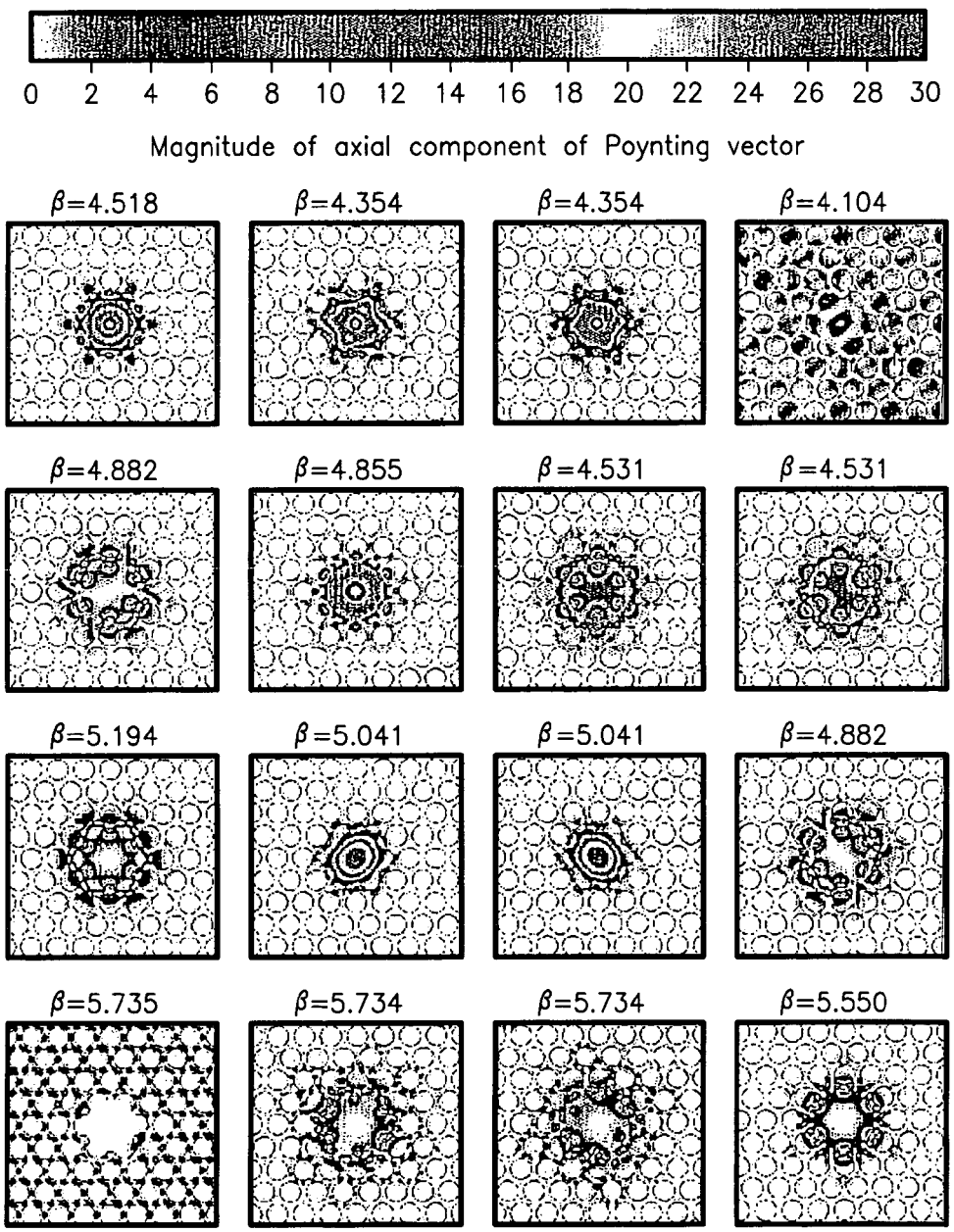

OPTICAL FIBRES

This invention was made with Government support under grant N00014-03-1-0313. The United States Government has certain rights in the invention.

BACKGROUND OF THE INVENTION

1. Field of the Invention

The present invention relates to optical fibres and, in particular, but not exclusively, to photonic crystal fibres that guide light by virtue of a photonic band-gap.

2. Description of the Related Art

A photonic crystal is a dielectric structure with a refractive index that varies periodically in space, with a period of the order of an optical wavelength. Such a structure has a photonic stop band if light cannot propagate (in any state of polarisation) for certain values of frequency and direction; Bragg diffraction takes place. If the stop band persists for all directions at a given frequency, the light cannot propagate at all and the photonic crystal has a full photonic band-gap; hereinafter referred to simply as a band-gap.

Prior to about 1995, most reports relating to two-dimensional (2-D) photonic crystals invariant in the third dimension (the longitudinal, or z, direction) were associated with so-called 'in-plane' band-gaps, in which light was restricted to the transverse plane; having no component in the z-direction so that the propagation constant $\beta=0$.

An example of a 2-D photonic crystal is a regular array of rods of one refractive index surrounded by a material with a different refractive index. The rods can, for example, be air columns in a solid material or solid columns of material surrounded by air or another solid material.

When light propagation is restricted to the transverse plane (in-plane), an in-plane 2-D band-gap can appear for a large refractive index contrast, typically in excess of 2.6, where refractive index contrast is defined herein as the ratio of high refractive index to low refractive index. Conveniently, in a two-material system, when the low refractive index material is air, or a vacuum, and the high refractive index material defines the structure, refractive index contrast is the same as the refractive index of the matrix material. Materials commonly used in photonic crystals are gallium arsenide or gallium aluminium arsenide, having refractive indices of around 3.6 and 3.45 respectively, and air, where increasing the refractive index contrast increases the band-gap bandwidth.

In "Full 2-D photonic band-gaps in silica/air structures", Birks et al., Electronics Letters, 26 Oct. 1995, Vol. 31, No. 22, pp. 1941–1942, it was reported that a full band-gap may be created in a 2-D photonic crystal when there is a propagation component in the longitudinal direction (out-of-plane). It was also reported that this could be achieved with a much lower refractive index contrast, for example around 1.45, than for an in-plane band-gap. In particular it was reported that a full out-of-plane 2-D band-gap could be produced in a silica-air system, where round air columns are arranged in a silica matrix in a hexagonal array. The authors went on to propose a radically new kind of optical fibre, having a hollow core region surrounded by a 2-D band-gap cladding structure, in which light would be confined to the core by the band-gap cladding structure.

Since this paper was published, several groups, including the authors of the paper, have made and reported practical band-gap fibres of the kind proposed by Birks et al.

The first practical band-gap fibre was reported in "Photonic Band Gap Guidance in Optical Fibres", Knight et al., 20 Nov. 1998, Vol. 282, Science, pp. 1476–1478. The fibre reported in this paper guided light by virtue of a band-gap, which confined the light to a small region of silica around a hollow air core. This paper demonstrated for the first time that light guidance could be performed by using a band-gap, associated with a 2-D photonic crystal structure, along an optical fibre. In this case, guidance was not in an air core.

The first band-gap fibre to guide light in an air core was reported in "Single-mode photonic band-gap guidance of light in air", Cregan et al., Science, Vol. 285, pp 1537–1539, 3 Sep. 1999. That this publication was not made until nearly four years after air-core-guidance in band-gap fibres were first predicted is an indication of the difficulties associated with making such a fibre. The reported fibre had a cladding, generally comprising a triangular lattice of air holes in a silica matrix, surrounding a core region having a size approximately equal to seven unit cells; a middle unit cell and the surrounding six unit cells.

In "Analysis of air-guiding photonic band-gap fibres", Broeng et al., Optics Letters, Vol. 25, No. 2, pp. 96–98, Jan. 15, 2000, the authors provided a theoretical analysis of an air-guiding, silica and air band-gap fibre. The band-gap fibre had a cladding defined by a triangular lattice of round air holes, which amounted to 70% by volume of the cladding structure, and a seven-cell core defect having a radius of $\sqrt{7}\Lambda/2$ (where $\Lambda$ is the lattice pitch of the cladding). The authors applied a variational method for solving the vectorial magnetic wave equation as an eigenvalue problem to analyse the band-gap structure. For a fixed out-of-plane wave-vector component $\beta$, a band diagram was generated that showed that, for a normalised propagation constant $\beta\Lambda=9.0$, a band-gap appeared at around a normalised frequency $k\Lambda$ of 9.0. This band-gap is seen to exist between the fourth and fifth photonic bands of the band diagram and was said to be the lowest frequency band-gap of the band-gap structure, although other band-gaps were said to exist, at least for other structures.

In the chapter entitled "Photonic Crystal Fibers: Effective Index and Band-Gap Guidance" from the book "Photonic Crystal and Light Localization in the $21^{st}$ Century", C. M. Soukoulis (ed.), ©2001 Kluwer Academic Publishers, the authors presented a useful overview of photonic crystal fibre technology. The chapter includes a description of a band structure for a triangular lattice of air holes, defined by a high dielectric material ($\in=13$), and a description of a band structure for a similar, silica and air structure having a seven-cell air-core defect (comparable with the structure in the preceding Broeng et al. paper).

Although the loss of practical band-gap fibres has decreased significantly since the idea was first proposed, see, for example, "Low Loss (13 dB/km) Air Core Photonic Band-Gap Fibre", Venkataraman et al., Post Deadline Session 1:PD1.1, ECOC 2002, the underlying design of reported band-gap fibres has not significantly changed. For example, the fibre reported in the aforementioned paper had a cladding structure formed from a silica matrix defining a triangular lattice of air-holes surrounding a core region, which is the size of about seven unit cells (each centred on a hole); a middle unit cell and the surrounding six unit cells. The main difference between this fibre and earlier fibres is that the cladding holes in the more recent fibres are larger, causing the cladding regions to have a higher fraction by volume of air.

In the paper "All silica photonic band-gap fiber", Riishede et al. CLEO 2003, paper CTuC5, the authors extended the theory first reported in the Birks et al. paper referred to previously herein. The authors reported that it is possible to make a band-gap fibre in which the band-gap is produced by an array of Ge-doped silica rods supported in a matrix of lower refractive index, un-doped silica. A core region of the fibre was also made of un-doped silica. The refractive index contrast in the reported fibre was extremely low, at around 1.45:1.47. In fact, the authors reported that they were able to produce full 2-D out-of-plane band-gaps with refractive index contrasts lower than one percent. This paper is significant in that it further distinguishes the theory of in-plane band-gaps, requiring a high refractive index contrast, from the theory of out-of-plane band-gaps.

SUMMARY OF THE INVENTION

An object of the present invention is to provide alternative band-gap fibres, which are formed from materials having higher refractive indices than silica. Such fibres may provide advantages over silica-air band-gap fibres, as will be considered in detail hereinafter.

The present inventors have determined that the band-gap that has been used in recent, low loss band-gap fibres, for example as described in the Venkataraman et al. paper, always resides between the fourth and fifth photonic bands of a band-gap structure. This is a characteristic of a triangular lattice cladding structure, as exemplified in the aforementioned Broeng et al. paper, which has been used with such fibres. This band-gap is typically (but not always) the one that is closest to the cladding cutoff of a triangular lattice band-gap structure and will be referred to hereafter as the fundamental band-gap.

The present inventors have investigated the properties of certain photonic band-gap structures and have identified a number of unforeseen and surprising characteristics that are associated with higher-order band-gaps.

According to a first aspect, the present invention provides an elongate waveguide for guiding light comprising:

a core, comprising an elongate region of relatively low refractive index; and a photonic band-gap structure that surrounds the core and is arranged to provide a photonic band-gap that can substantially confine light to the core, the structure comprising elongate regions of relatively low refractive index interspersed with elongate regions of relatively high refractive index, wherein, the band-gap resides above the fifth photonic band of the band-gap structure.

The characteristics of the waveguide, for example its light-confining ability and its bandwidth, are typically determined by the nature of the band-gap. The nature of the band-gap, for example its position in a band structure, its frequency range and ability to support guided modes, are typically determined by the configuration of the photonic band-gap structure. Accordingly, the configuration of the photonic band-gap is selected to provide the required band-gap characteristics, as will be described hereinafter.

The band-gap may reside above the eighth photonic band of the band-gap structure, for example between the eighth and ninth photonic bands of the band-gap structure.

The photonic band-gap structure may provide a number of additional photonic band-gaps. Then, the first-mentioned photonic band-gap may have a higher figure of merit than any one of the additional photonic band-gaps (if any) that is able to substantially confine light to the core. Additionally, or alternatively, the photonic band-gap may be the lowest-order band-gap that is able to substantially confine light to the core. Any additional band-gap that resides below the fifth band of the band-gap structure may be unable to substantially confine light to the core. In particular, any additional band-gap that resides between the fourth and fifth bands of the band-gap structure may be unable to substantially confine light to the core. For example, according to some embodiments of the present invention, the so-called fundamental band-gap may not be able to substantially confine light to the core when the first-mentioned band-gap can.

A refractive index contrast between the relatively high refractive index and the relatively low refractive index may be at least 1.5. The refractive index contrast may be higher than 1.5 or, for example, higher than 1.6, 1.7, 1.8, 1.9, 2.0, 2.1, 2.2, 2.3, 2.4, 2.5, 2.6, 2.7, 2.8, 2.9, 3.0 or even higher than 3.0. For a two-material system, the refractive index contrast is defined herein as the ratio of relatively high refractive index to relatively low refractive index. For a system comprising more than two materials, the ratio may be calculated using the highest refractive index and the lowest refractive index.

Of course, the photonic band-gap structure may comprise regions having more than two different refractive indices, in which case, the refractive index contrast may relate to the highest and lowest of the refractive indices.

Advantageously, the present inventors have identified a number of higher-order band-gaps, which are found to be prominent in at least some band-gap structures having a refractive index contrast higher than, 1.8. While these band-gaps are also present at lower refractive index contrasts, they are not prominent, being significantly smaller than the fundamental band-gap, and have not been identified as being of practical significance in studies of silica-air band-gap fibres.

The use, in theory, of high index glasses to make band-gap fibres has been mentioned briefly in WO 02/14946 (Broderick et al.), which is particularly concerned with non-silica photonic crystal fibres having a solid core. Such fibres typically do not guide light by photonic band-gap. WO 02/14946, however, speculates that it may be possible to make band-gap fibres using glasses having a refractive index in the region of 2.5. The brief description in this patent application is based on a clear assumption that a higher refractive index contrast produces a stronger band-gap in a band-gap fibre. This, in general, is not the case for out-of-plane band-gaps, as will be described hereinafter. While the assumption may be true for in-plane band-gaps, which are associated with 2-D photonic crystals, there is no basis to suggest that it would be true for out-of-plane band-gaps. Indeed, the behaviour of in-plane and out-of-plane band-gaps has been shown to differ significantly. For example, the 1995 Electronics Letters and, in particular, the 2003 CLEO paper, both referred to hereinbefore, show that out-of-plane band-gaps can remain open in significantly lower refractive index contrast systems than in-plane band-gaps. This suggests that it would be naïve to predict the behaviour of out-of-plane band-gaps on the basis of the behaviour of in-plane band-gaps.

At least an inner region of the core may have a refractive index substantially equal to one. For example, the core may be filled with air, another gas or be under a vacuum. Likewise, in addition, or alternatively, at least some of the relatively low refractive index regions may have a refractive index substantially equal to one. Then, the refractive index contrast is substantially equal to the refractive index of the higher refractive index regions, which define the structure of the band-gap structure.

The band-gap may be arranged to confine to the core light having a wavelength of at least 1.55 μm. For example, the band-gap may be arranged to confine to the core light having a wavelength longer than 1.55 µm, 2 µm, 3 µm, 4 µm, 5 µm, 6 µm, 7 µm, 8 µm, 9 µm, 10 µm or even longer than 10 µm. Additionally, or alternatively, the band-gap may be arranged to confine to the core light having a wavelength shorter than 20 µm or even shorter than 15 µm.

The present inventors believe that operation at a longer wavelength than usual may find application for specific purposes, for example IR spectroscopy. In addition, the present invention may facilitate long distance transmission at higher than usual wavelengths.

The photonic band-gap structure may be substantially transparent to light having a wavelength of at least 1.55 µm. For example, the band-gap structure may be substantially transparent to light having a wavelength longer than 1.55 µm, 2 µm, 3 µm, 4 µm, 5 µm, 6 µm, 7 µm, 8 µm, 9 µm, 10 µm or even longer than 10 µm. Thus, for example, for photonic band-gap structures in which the relatively low refractive index regions are air, the material forming the relatively high refractive index regions would be substantially transparent to light of these longer wavelengths. Additionally, or alternatively, the photonic band-gap structure may not be transparent to light having a wavelength shorter than 20 µm or even shorter than 15 µm.

The optical absorption spectrum of silica glass makes it unsuitable for low-loss transmission at mid-infrared and far-infrared wavelengths. The identification of these new, prominent band-gaps allows use of alternative materials to allow band-gap fibres to find application in the mid/far-infrared wavelength ranges.

Suitable glasses would be, for example, tellurite and chalcogenide glasses (see, for example, "Tellurite Glass: a new candidate for fiber devices", Wang et al., Optical Materials 3, 187–203, 1994), which have low absorption in the mid/far-IR. These glasses have relatively high refractive indices (nominally 1.8–2.3 and 2.4–2.7, respectively).

The present applicant has appreciated that the ability to operate band-gap fibres at longer wavelengths may be important in the field of band-gap fibres. For example, a potentially significant source of loss in band-gap fibres is mode coupling, which transfers power from a fundamental mode to other core-guided, core boundary surface or cladding modes. Of course, mode coupling can result from known mechanisms, for example perturbations in the structure of a fibre and excessive fibre bending. However, the present applicant has identified that mode coupling in band-gap fibres may, in addition, result at least in part from roughness of surfaces, for example, at glass-air interfaces in air-core fibres.

In order to reduce the impact of surface roughness, the co-pending and (at the time of filing the present patent application) unpublished patent applications GB0306606.5 and GB0306593.5 propose band-gap fibres that confine a mode within an air-core such that the light intensity of the mode is relatively low at the glass-air interfaces. This has the effect of mitigating mode coupling induced by the surface roughness of the glass-air interfaces. The present applicant proposes that an additional, or alternative, way of reducing the impact of surface roughness may be to operate band-gap fibres at longer wavelengths in order to reduce the impact of Rayleigh scattering. This may not be practical using silica, which has reduced transparency at longer wavelengths, but may be facilitated by using higher refractive index glasses according to embodiments of the present invention. Furthermore, some higher refractive index materials may have naturally smoother surfaces than, say, silica, and use of such materials may lead to reduced mode-coupling loss.

The photonic band-gap structure may comprise a fraction by volume of relatively low refractive index regions (for example, air) lower than 0.8. Surprisingly, the present inventors have identified that certain higher-order band-gaps are more prominent if the photonic band-gap structure comprises a fraction by volume of relatively low refractive index regions (e.g. air) lower than 0.8. The value of the fraction by volume of relatively low refractive index regions may be lower than 0.77, 0.75, 0.73, 0.70, 0.68, 0.65, 0.60 or 0.55. The selected value may depend on the particular form of the photonic band-gap structure and is expected to vary depending on various other factors, such as refractive index contrast and operating wavelength. A photonic band-gap structure according to embodiments of the present invention typically (but not always) has an over-cladding, comprising one or more layers of solid material, which form an outer cladding of the waveguide. This over-cladding is, typically, not taken into account when calculating the fractional volumes of relatively low or high refractive index regions.

Certain higher order band-gaps are seen to reduce in prominence as the fraction by volume of air is increased or decreased beyond certain points. The value may be between 0.45 and 0.80. More specifically, the value may be between 0.52 and 0.70. Even more specifically, the value may be between 0.55 and 0.67, between 0.56 and 0.66 or between 0.58 and 0.64.

Hitherto reported, practical, low-loss band-gap fibres, using the fundamental band-gap in a silica-air fibre, have typically required a relatively high fraction by volume of air in the cladding structure, typically in excess of 80% air, in order to produce an operational fibre with a sufficiently large band-gap for practical air-guidance. Increased fractions by volume of air in these fibres (up to practical fabrication limits) have been shown to increase the prominence of the band-gaps and decreased fractions by volume of air have been shown to decrease the prominence of band-gaps. WO 02/14946 suggests that the use of higher refractive index contrasts could facilitate the use of smaller holes, presumably, on the basis that a higher refractive index contrast leads naturally to stronger band-gaps and, hence, while the use of smaller holes would reduce the strength of the band-gap, the reduction would not be material to operation. However, as will be shown hereinafter, the general assumption in WO 02/14946 that out-of-plane band-gaps increase in strength with increasing refractive index contrast is wrong. Therefore, a suggestion based on the assumption is invalid.

The photonic band-gap structure may comprise a lattice having a lattice pitch Λ. For example, the photonic band-gap structure may comprise a triangular lattice of unconnected, relatively low refractive index regions having a characteristic transverse dimension d, which is defined herein as the diameter of the largest inscribed circle that fits within a relatively low refractive index region.

While in the prior art triangular lattices are most commonly associated with band-gap fibres, the present inventors predict that the higher order band-gaps, which are newly characterised herein, may also be associated with other lattices, for example square, honeycombe and Kagome lattices. As such, the present invention is not limited only to triangular lattices.

Additionally, it will be appreciated that it is not necessary for the photonic band-gap structure to comprise a periodic lattice. For example, it has been reported, in Litchinitser et al., Opt Lett., Vol. 27 (2002) pp. 1592–1594 that the photonic band-gap structure need not be periodic. Although the aforementioned paper does not provide calculations explicitly for band-gap fibres, it does illustrate that band-gaps may be obtained without periodicity. Additionally, Konorov et al., Journal of Experimental and Theoretical Physics, Vol. 96, No. 5, 2003, pp. 857–869 report that light may be guided in a hollow core fibre even when holes in the cladding structure are disordered.

Indeed, it is highly unlikely in practice that a band-gap fibre comprises a 'perfect' structure, due to imperfections introduced (accidentally or intentionally) during its manufacture and/or perturbations existing by virtue of the presence of a core region. As used herein, therefore, any reference to "array", "periodic", "lattice", or the like, imports the likelihood of imperfection, in particular, around the core region. This implies that a band-gap fibre that is more resilient to fluctuations in certain physical, geometric parameters may be advantageous.

In embodiments in which the photonic band-gap structure is periodic and the relatively low refractive index regions have a transverse dimension d, the photonic band-gap structure may have a ratio of d/Λ in the range $0.72 \leq d/\Lambda \leq 0.88$. More specifically, the ratio may be in the range $0.76 \leq d/\Lambda \leq 0.84$, $0.78 \leq d/\Lambda \leq 0.82$ or $0.79 \leq d/\Lambda \leq 0.81$.

The photonic band-gap structure may have a value $V_0^2$ (as defined hereinafter) in the range $130 \leq V_0^2 \leq 160$. More specifically, the value may be in the range $140 \leq V_0^2 \leq 155$ or $145 \leq V_0^2 \leq 153$.

The photonic band-gap may have a normalised centre frequency $k_0\Lambda$ (as defined herein) in the range $5 \leq k_0\Lambda \leq 6$, when $d/\Lambda=0.8$ and the refractive index contrast is 2.4, or a normalised centre frequency $k_0\Lambda$, of the same photonic band-gap, that is scaled with either or both d/Λ and refractive index contrast between the relatively high refractive index and the relatively low refractive index. As will be described hereinafter, at least some of the higher order band-gaps scale predictably with d/Λ and refractive index contrast and the present invention includes waveguides arranged to exhibit these band-gaps scaled to have any respective normalised centre frequency. In addition, as will also be described hereinafter, the definition of normalised centre frequency may vary depending on the position of the band-gap.

The regions of relatively low refractive index may have a substantially round cross section with a cross-sectional diameter d. Alternatively, the regions may be substantially hexagonal in cross section with a cross-sectional dimension d, which has the same value as the distance between parallel sides of the hexagon. A hexagonal region in a practical band-gap fibre is likely to have slightly rounded corners. Herein, therefore, hexagonal can mean any generally hexagonal shape having corners that are either sharp or rounded.

According to a second aspect, the present invention provides an elongate waveguide for guiding light comprising:

a core, comprising an elongate region of relatively low refractive index; and a photonic band-gap structure that surrounds the core and is arranged to provide a photonic band-gap that can substantially confine light to the core, the structure comprising elongate regions of relatively low refractive index interspersed with elongate regions of relatively high refractive index, characterised by the photonic band-gap having a value of $V_0^2$ (as defined hereinafter) in the range $130 \leq V_0^2 \leq 160$.

The photonic band-gap according to this aspect may reside above the fifth photonic band of the band-gap structure. For example, the band-gap may reside above the eighth photonic band of the band-gap structure. In particular, the photonic band-gap may reside between the eighth and ninth photonic bands of the band-gap structure.

In such a waveguide the photonic band-gap structure may comprise a triangular lattice, having a lattice pitch Λ. For example, the photonic band-gap structure may comprise a triangular lattice of unconnected relatively low refractive index regions having a characteristic transverse dimension d. Then, the photonic band-gap structure may have a ratio of d/Λ, where $0.72 \leq d/\Lambda \leq 0.88$.

According to a third aspect, the present invention provides an elongate waveguide for guiding light comprising:

a core, comprising an elongate region of relatively low refractive index; and a photonic band-gap structure that surrounds the core and is arranged to provide a photonic band-gap that can substantially confine light to the core, the structure comprising a lattice of spaced apart elongate regions of relatively low refractive index embedded in a relatively high refractive index matrix, the lattice having a lattice pitch Λ and the elongate regions of relatively low refractive index having a transverse dimension d, characterised by the photonic band-gap having a normalised centre frequency $k_0\Lambda$ (as defined herein) in the range $5 \leq k_0\Lambda \leq 6$, when $d/\Lambda=0.8$ and the refractive index contrast is 2.4, or a normalised centre frequency $k_0\Lambda$, of the same photonic band-gap, that is scaled with either or both d/Λ and refractive index contrast between the relatively high refractive index and the relatively low refractive index.

According to a fourth aspect, the present invention provides a method of operating the elongate, light-guiding waveguide of the kind described hereinbefore, the method being characterised by the step of coupling into the waveguide light having a wavelength which is substantially confined to the core by the photonic band-gap.

According to a fifth aspect, the present invention provides a method of forming an elongate waveguide comprising the steps of: selecting an operating wavelength of light for the waveguide; generating a design for a waveguide having a core, comprising an elongate region of relatively low refractive index, and a photonic band-gap structure that surrounds the core and is arranged to provide a photonic band-gap, above the fifth photonic band of the band-gap structure, that can substantially confine light, having the selected operating wavelength, to the core, the structure comprising elongate regions of relatively low refractive index interspersed with elongate regions of relatively high refractive index; and manufacturing the elongate waveguide according to the design.

According to a sixth aspect, the present invention encompasses use of the elongate waveguide of the kind described hereinbefore including coupling into the waveguide light having a wavelength which is substantially confined to the core by the photonic band-gap.

BRIEF DESCRIPTION OF THE DRAWINGS

Other aspects and embodiments of the present invention will become apparent from the following description, drawings and claims.

The present invention will now be described by way of example only with reference to the accompanying drawings, of which:

FIG. 9 shows charts which quantify the figures of merit of two kinds of band-gaps for varying values of $d/\Lambda$ and refractive index;

FIG. 14 shows band-gap plots, represented as $(\beta\text{-}k)\Lambda$ against $k\Lambda$, which identify how the band-gap properties of a band-gap structure, comprising a solid matrix material defining a triangular lattice of elongate holes, vary with variations in hole cross-section in a range from round to hexagonal;

FIG. 18 shows plots of various different modes that are supported by an exemplary band-gap fibre structure.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
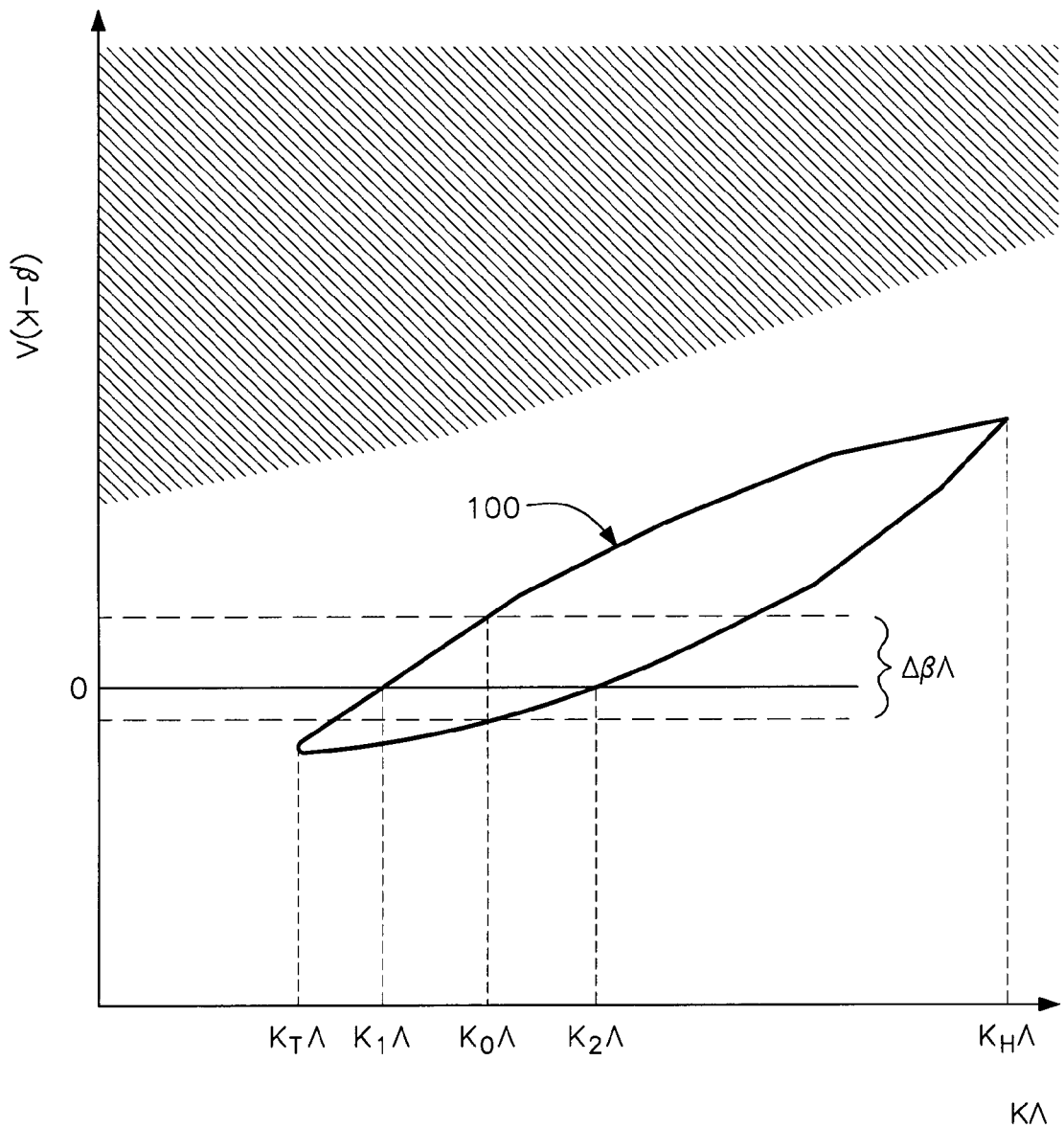
FIG. 1 is a schematic plot of an exemplary band-gap, represented as (β-k)Λ against kΛ.
Figure 2:
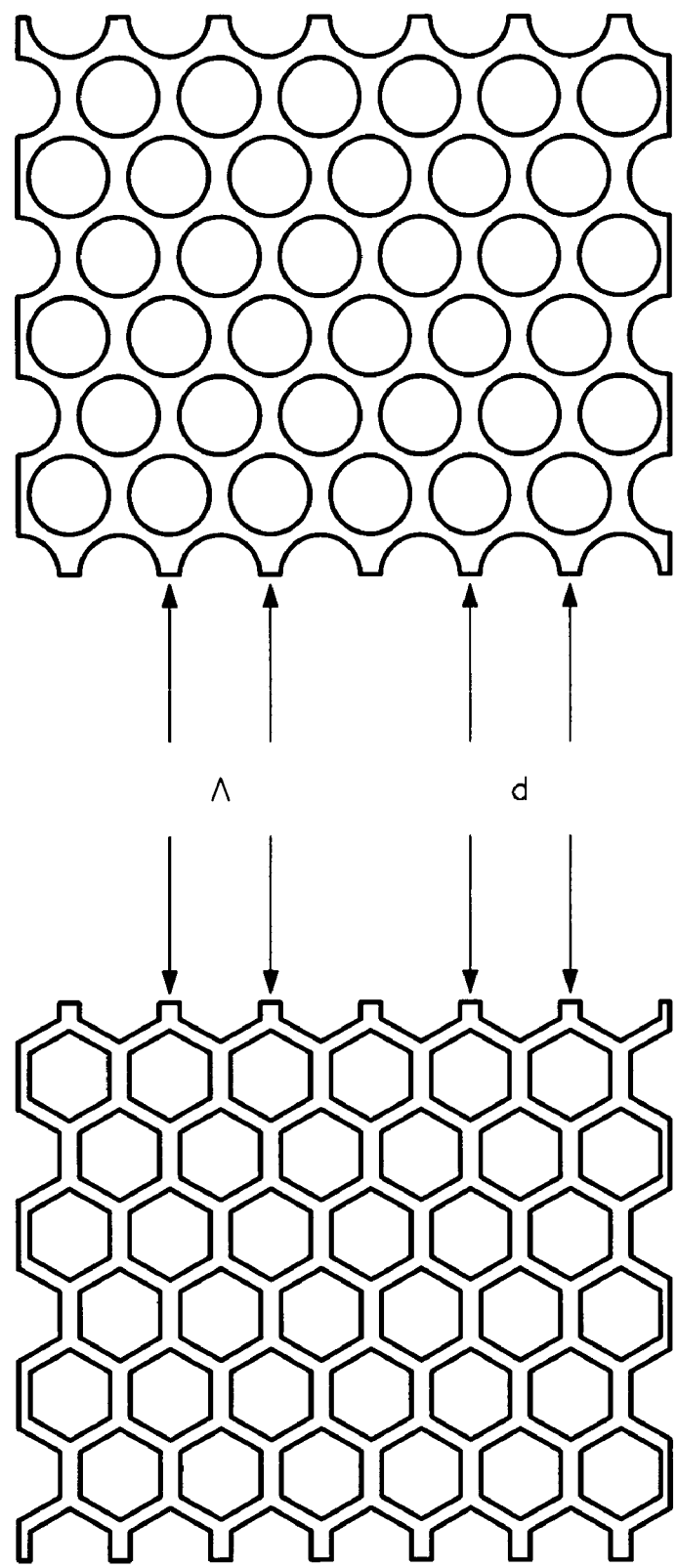
FIG. 2 shows diagrams of two alternative exemplary triangular lattices suitable for use as photonic band-gap structures.

The diagram in FIG. 1 is an idealised plot of a band-gap 100 for a notional periodic out-of-plane 2-D band-gap structure, for example as illustrated in transverse cross section in the upper diagram in FIG. 2. This kind of plot will be used hereinafter to illustrate the band-gap properties of different band-gap structures. The numerical method employed to generate such plots is a highly efficient Fourier-based scheme which allows up to a million basis (plane) waves to be incorporated so that high accuracy results may be obtained even at high index contrasts.

The horizontal axis of the plot is the normalised frequency $k\Lambda$, where $k=2\pi/\lambda$. The vertical axis represents what will be referred to herein as the normalised excess propagation constant $(\beta\text{-}k)\Lambda$, where $\beta$ is the propagation constant, or component of the wave vector in the z-direction of the band-gap structure. Both the horizontal and vertical axes of the plot are normalised with respect to the pitch, $\Lambda$, of the respective periodic band-gap structure. Of course, as has already been mentioned, a band-gap structure need not be periodic for there to be a band-gap. However, for ease of understanding only, the following exemplary embodiments are based on familiar triangular lattice band-gap structures.

Hence, the band-gap 100 can be defined as a bounded region in the plots, in which, for all points $(\beta, k)$ in the region, light cannot propagate through the cladding.

An 'air line' on the plot is represented as a horizontal line at $(\beta\text{-}k)\Lambda=0$. It is only possible to support a guided mode in an air-core of a band-gap fibre if at least a portion of the band-gap 100 is below the air line, as it is in the plot in FIG. 1. As a general rule, any mode that resides inside the band-gap, above the air line, will be evanescent in air whereas a mode that resides inside the band-gap, below the air line, may be air guiding.

Of course, in a band-gap structure made using a material other than air for the low refractive index regions, there would be a line associated with the lower refractive index material rather than with air. For example, in the CLEO 2003 paper referred to hereinbefore, there would be a 'silica line', instead of an air line, at $(\beta\text{-}kn_{silica})\Lambda=0$.

For reasons of simplicity of description herein, the following embodiments are based on glass-air systems, although, it will be appreciated, the principles apply equally to other material systems used to create associated refractive index steps in a band-gap structure.

The shaded area in the upper left-hand region of the plot represents a cladding cutoff region of the band-gap structure, where no propagating modes are supported.

When comparing different band-gaps, it is helpful to adopt a figure of merit (FOM), which indicates the light-confining ability of a band-gap. In WO 02/14946, mentioned hereinbefore, the inventors refer to band-gap "strength", which may be a similar measure to the present FOM. The present inventors have adopted a FOM defined as:

$$FOM=h_\omega \cdot h_\beta, \qquad \text{Equation 1}$$

where $h_\omega$ is the normalised band-gap width and $h_\beta$ is the normalised band-gap depth.

With reference to the plot in FIG. 1, a normalised centre frequency $\omega_0\Lambda/c=k_0\Lambda$ of a band-gap, at the point where the band-gap crosses the air line, equals $(k_2\Lambda+k_1\Lambda)/2$, where c is the speed of light. Accordingly, normalised band-gap width is defined herein as:

$$h_\omega=(k_2\Lambda-k_1\Lambda)/k_0\Lambda \qquad \text{Equation 2}$$

Clearly, only band-gaps that intersect the air line have a FOM as defined herein. Although, in principle, band-gaps that fall entirely below the air line can also support guided modes, the present inventors have found that the band-gaps of interest, which are associated with the embodiments presented herein, do intersect the air line. Hence, use of the FOM defined in Equation 1 is an appropriate comparative measure herein. However, in the event a band-gap of interest falls entirely below the air line, an associated FOM may be calculated using a normalised centre frequency defined as the mid-point between the low frequency extreme $k_L\Lambda$ and the high frequency extreme $k_H\Lambda$ of the band-gap. Of course, an FOM value defined in this way would only be usefully comparable with the FOM values of other band-gaps that fall entirely below the air line. Comparing the FOM value of a band-gap that crosses the air line with the FOM value of a band-gap that falls entirely below the air line would typically require consideration, in addition, of the position of respective modes of interest that fall within the respective band-gaps. Such a comparison is beyond the scope of the present description, although the reader is referred to "A 'poor man's approach' to modelling micro-structured optical fibres", Riishede et al., Journal of Optics A: Pure and Applied Optics 5 (2003) 534–538 for further details of identifying modes in a band-gap fibre.

The normalised band-gap width $h_\omega$ is itself an important measure of the band-gap, since it represents the approximate operating bandwidth of the band-gap.

Also, with reference to the plot in FIG. 1, normalised band-gap depth is defined herein as:

$$h_\beta = \Delta\beta\Lambda/k_0\Lambda \qquad \text{Equation 3}$$

The normalised band-gap depth $h_\beta$ is also an important measure of the band-gap. In some embodiments, it is desirable for an air-guided mode to be spaced in terms of $\beta$ as far away from the edges of the band-gap as possible, in order to minimise the potential for undesirable coupling of mode power, or simply mode coupling, from the air-guided mode to cladding modes, for example, due to slight imperfection in the band-gap structure. A large value of normalised band-gap depth $h_\beta$ enables this for non-Rayleigh scattering mechanisms.

It will be appreciated that one band-gap, which either intersects the air line or falls entirely below the air line, may have a normalised centre frequency value, $k_0\Lambda$, close to the normalised centre frequency value, $k_0\Lambda$, of a different band-gap, which also either intersects the air line or falls entirely below the air line. In this case, both band-gaps may support core-guided modes and it may be insufficient to distinguish one band-gap from the other by specifying only an approximate normalised centre frequency value or range of values. In order to avoid confusion about which of the band-gaps is being referred to herein, as a convention and unless otherwise indicated, the band-gap referred to is the one that has an average value of $(\beta-k)\Lambda$ that is closest to the air line; where the average value of $(\beta-k)\Lambda$ is the mid-point between the upper and lower edges of the band-gap at its respective normalised centre frequency.

The FOM defined in Equation 1 takes into account both normalised band-gap width and normalised band-gap depth and is, therefore, a useful measure. However, since both normalised band-gap width and normalised band-gap depth are independently important, it will be appreciated that a large FOM value based on one relatively large value and one relatively small value may not be practically useful.

It will also be appreciated that a band-gap is scalable with wavelength and pitch of a band-gap structure. For example, air guidance at different wavelengths of light can be achieved within a particular band-gap by varying the pitch of the band-gap structure, according to the relationship $\lambda=2\pi\Lambda/k\Lambda$, where the $k\Lambda$ value is read directly from an appropriate band-gap plot.

Another factor that determines whether a band-gap fibre could support an air-guided mode in its core is the core diameter. An estimate of the number of modes N supported by a band-gap fibre may be made, according to the Cregan et al. paper referred to hereinbefore, using the relationship:

$$N = \frac{((\beta_H\Lambda)^2 - (\beta_L\Lambda)^2)r_{CO}^2}{4\Lambda^2} \qquad \text{Equation 4}$$

where $\beta_H\Lambda$ and $\beta_L\Lambda$ are the upper and lower edges of the band-gap at the normalised centre frequency $k_0\Lambda$ and $r_{CO}$ is the radius of a core.

Some exemplary embodiments described hereinafter have cladding structures based on the lattices illustrated in FIG. 2.

In FIG. 2, the upper diagram shows, in transverse cross section, part of a triangular lattice of circular air holes (represented as light regions) embedded in a solid matrix material (represented as dark regions), such as silica glass. A pitch $\Lambda$ of the structure is defined as the shortest translation distance for a smallest unit cell of the structure. The holes in the upper diagram have a round cross section and a diameter d.

The lower diagram in FIG. 2 shows, in transverse cross section, a triangular lattice of hexagonal air holes embedded in a solid matrix material. Again, a pitch $\Lambda$ of the structure is defined as the shortest translation distance for a smallest unit cell of the structure. In this case, the holes have a hexagonal cross section and a dimension d, which is defined as the distance between parallel sides of a hexagon.

Two additional, related characteristics of a band-gap structure may be defined as $d/\Lambda$ and the fraction by volume of air, hereafter referred to air-filling-fraction (AFF), of the structure. Clearly, for holes of a given cross-sectional shape, AFF usually varies proportionally with $(d/\Lambda)^2$. In addition, as hole shape varies, for a given value of $d/\Lambda$, AFF varies, and vice-versa. For example, for the upper band-gap structure in FIG. 2, having round air holes, the value of $d/\Lambda$ is about 0.8, which equates to an AFF of around 0.58; or 58% air. For example, for the lower diagram in FIG. 2, having hexagonal holes, the value of $d/\Lambda$ is also about 0.8, while the AFF is around 0.64; or 64% air.

FIGS. 3 to 8 each show three different band-gap plots, A–C, for three 2-D band-gap structures made from a triangular lattice of round air holes in a high refractive index matrix material. The plots A–C in each Figure vary in value of $d/\Lambda$ (and AFF), which are respectively 0.64 (0.37), 0.8 (0.58) and 0.96 (0.84). Each of FIGS. 3 to 8 relates to a different high refractive index material, in the period 1.5 to 3.0 in steps of 0.3 respectively.

A band-gap labelled F in any plot is a fundamental band-gap, which resides between the fourth and fifth bands of each structure, and a band-gap labelled H is a higher order band-gap, which resides between the eight and ninth bands for each structure and which may find application in embodiments of the present invention.

Figure 3:
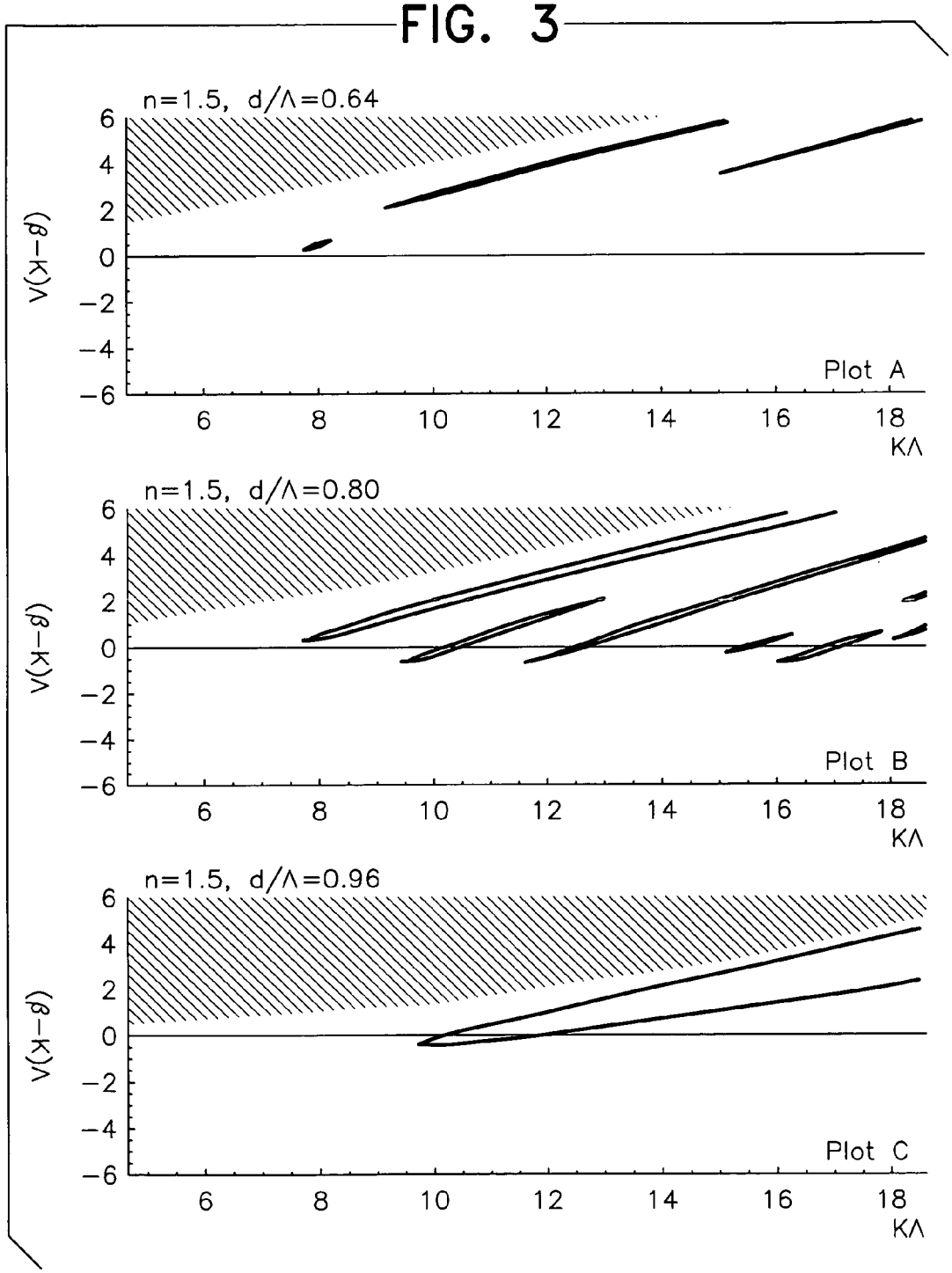
FIGS. 3 to 8 are band-gap plots, represented as $(\beta\text{-}k)\Lambda$ against $k\Lambda$, showing variations in band-gap characteristics with varying values of $d/\Lambda$ and refractive index.

As shown in plot A of FIG. 3, which is associated with a refractive index of 1.5, there are three visible band-gaps (or portions of band-gap) in the range of $k\Lambda$ shown. None of these band-gaps are below or crossing the air line and, therefore, could not support an air-guided mode in a respective band-gap fibre.

In contrast to plot A, plot B in FIG. 3 shows a group of four band-gaps crossing the air line; the lowest frequency band-gap of the group labelled H. It is possible, therefore, that a band-gap fibre having at least one of the band-gaps could be arranged to guide light in an air core. The FOM of the band-gap H is approximately 0.0009. This group of band-gaps, or similar, is also evident in plots B in FIGS. 3 to 8.

Using Equation 4, it is possible to determine the approximate number of air-guided modes that can be supported by a band-gap fibre based on band-gap H in plot B. From the plot, estimated values for $\beta_H\Lambda$ and $\beta_L\Lambda$ are 10.5 and 10.26 respectively. By substituting these values into Equation 4, the approximate number of air-guided, core modes that could be supported by a respective band-gap fibre is 1.25 $(r_{CO}/\Lambda)^2$. The core radius, therefore, needs to be greater than about $1\Lambda$, otherwise N<1, implying that the structure would be unlikely to support a mode.

While, in principle, a band-gap fibre having the band-gap H in plot B of FIG. 3 could support an air-guided mode, provided the respective structure had a sufficiently large core, the relatively low value of FOM (compared with some values found hereafter) indicates that the mode might be near, in terms of $\beta$, to cladding modes. Therefore, it is possible that air-guided modes supported by this band-gap may suffer unduly from coupling of power into the cladding modes, for example, as a result of slight imperfections or bends in the respective fibre. However, this does not mean that the band-gap lacks practical application under all circumstances.

The FOM values for the next three band-gaps in the group in plot B of FIG. 3 are each significantly less than band-gap H; bearing in mind that they are each normalised with their respective, higher, centre frequencies. As such, these band-gaps are less likely to support a well-guided mode than band-gap H.

Plot C shows only band-gap F crossing the air line. Band-gap F did not cross the air line in previous plots but, in plot C, it does and it has an approximate FOM value of 0.0087, which is nearly an order of magnitude bigger than the best FOM value for band-gap H in plot B.

From plot C, the values estimated for $\beta_H \Lambda$ and $\beta_L \Lambda$ are approximately 11.55 and 10.84 respectively. By substituting these values into Equation 4, the approximate number of air-guided, core modes that could be supported by a respective band-gap fibre is found to be $3.97(r_{CO}/\Lambda)^2$. This value is approximately three times the corresponding value for the lowest frequency band-gap H in plot B.

Accordingly, it can be assumed that a band-gap fibre exhibiting the band-gap shown in plot C of FIG. 3 could support an air-guided mode, which is well-spaced, in terms of $\beta$, from the cladding modes.

The band-gap F, as shown in plot C of FIG. 3, is the one that is associated with previously-reported, practical, low-loss, air-guiding band-gap fibres. It is easy to appreciate, from the high FOM value, why this band-gap has been the one focused on in prior art reports. For example, since the band-gap has an approximate normalised centre frequency $k_0 \Lambda$ of 11, an exemplary fibre using the band-gap could be arranged to guide light at around 1550 nm by having a cladding hole pitch in the region of 2.7 µm. Then, by arranging a core region to be a seven cell defect—the size of an inner cell and the six cells surrounding the inner cell—as has typically been the case in the prior art, the core region would have an approximate radius of 1.5Λ. By substituting these values into Equation 4, it can be established that the fibre would support in the order of nine air-guided, core modes.

It will be appreciated that a value of d/Λ=0.96 for the band-gap F in plot C in FIG. 3 is a relatively high value, which equates to an AFF of around 0.84. This high value coincides with typical AFF that have been reported for practical band-gap fibres. Indeed, typically, reported fibres have had holes that are nearer to being hexagonal than round in cross section, which means that the associated AFF would more than likely be even higher than 0.84.

Figure 4:
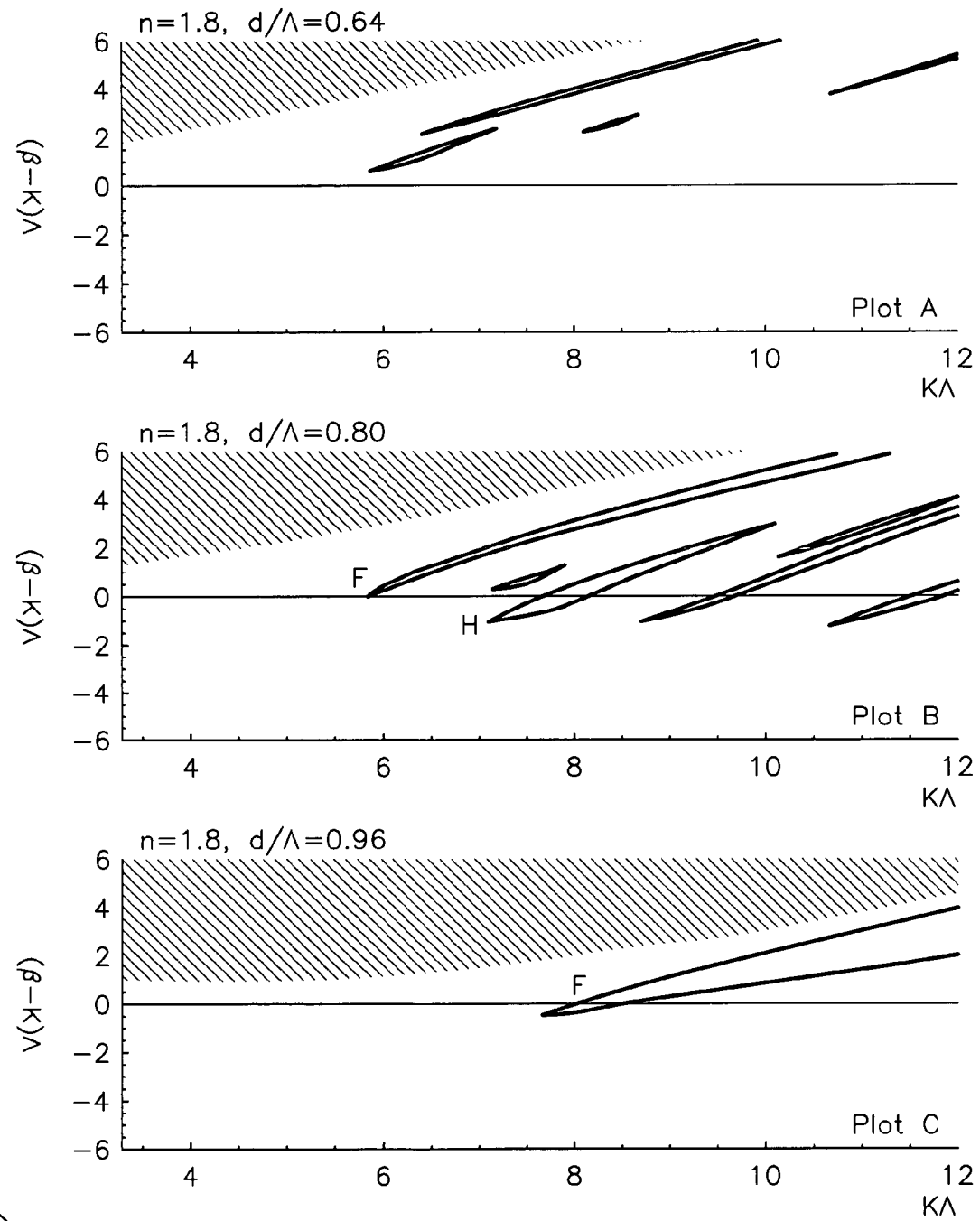

The band-gap structures associated with plots A–C in FIG. 4 have a refractive index contrast of 1.8 and the evolution from plot to plot of the band-gaps is similar to the evolution of the band-gaps in FIG. 3.

The FOM value for band-gap F in plot C of FIG. 4 is approximately 0.0044. This value is only approximately half of the FOM value of the similar band-gap F in plot C of FIG. 3. Clearly, this band-gap is not increasing in prominence as refractive index contrast increases.

Plot B in FIG. 4 shows a band-gap H, which has a FOM value of approximately 0.0046. This band-gap is significantly more prominent than it was in FIG. 3. Indeed, the band-gap H has a FOM value that is similar in size to the FOM value for band-gap F in plot C of FIG. 4.

Due to the sparse range of d/Λ values plotted, it is not easy to determine whether band-gap F or band-gap H has the highest FOM value for a triangular array of circular holes in a glass matrix having a refractive index of 1.8. However, it appears likely that band-gaps F and H in FIG. 4 have similar maximum FOM values. This is in contrast to band-gaps F and H in FIG. 3, where it appears that band-gap F has the highest FOM value by a significant margin.

Figure 5:
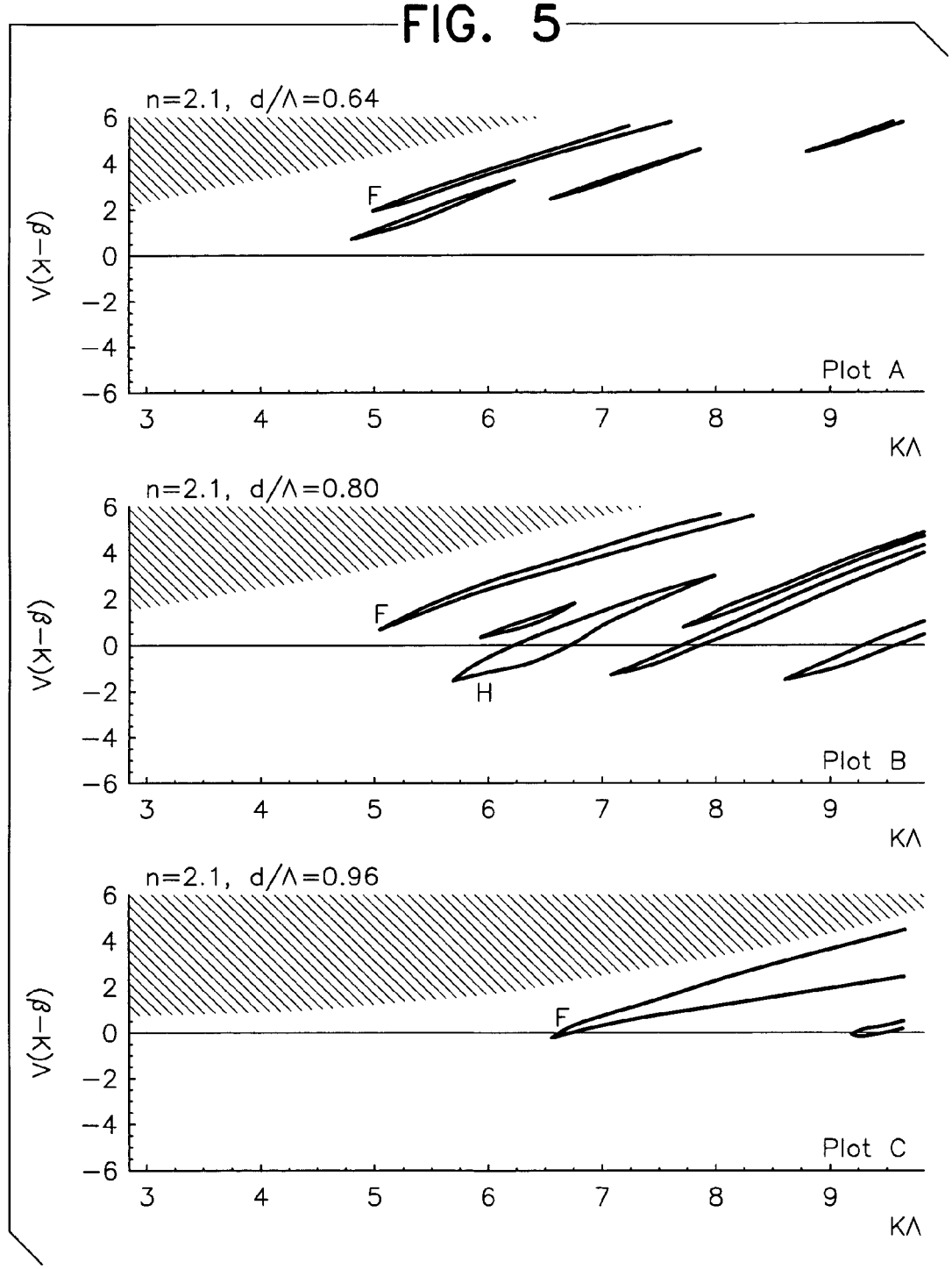

The band-gap structures associated with plots A–C in FIG. 5 have a refractive index contrast of 2.1 and the evolution from plot to plot of the band-gaps is, again, similar to the evolution of the band-gaps in FIGS. 3 and 4.

The FOM value for band-gap F in plot C of FIG. 5 is only approximately 0.0001. This value is relatively small compared to previous respective values and it appears unlikely that the band-gap F could support a practical air-guided mode.

Plot B in FIG. 5 again shows a band-gap H, which has a FOM value of approximately 0.0117. This FOM value is significantly higher than even the value for band-gap F in plot C of FIG. 3. This is surprising and indicates that it would be advantageous to use this band-gap, rather than band-gap F, to make a band-gap fibre from glass having a refractive index in the region of 2.1.

Figure 6:
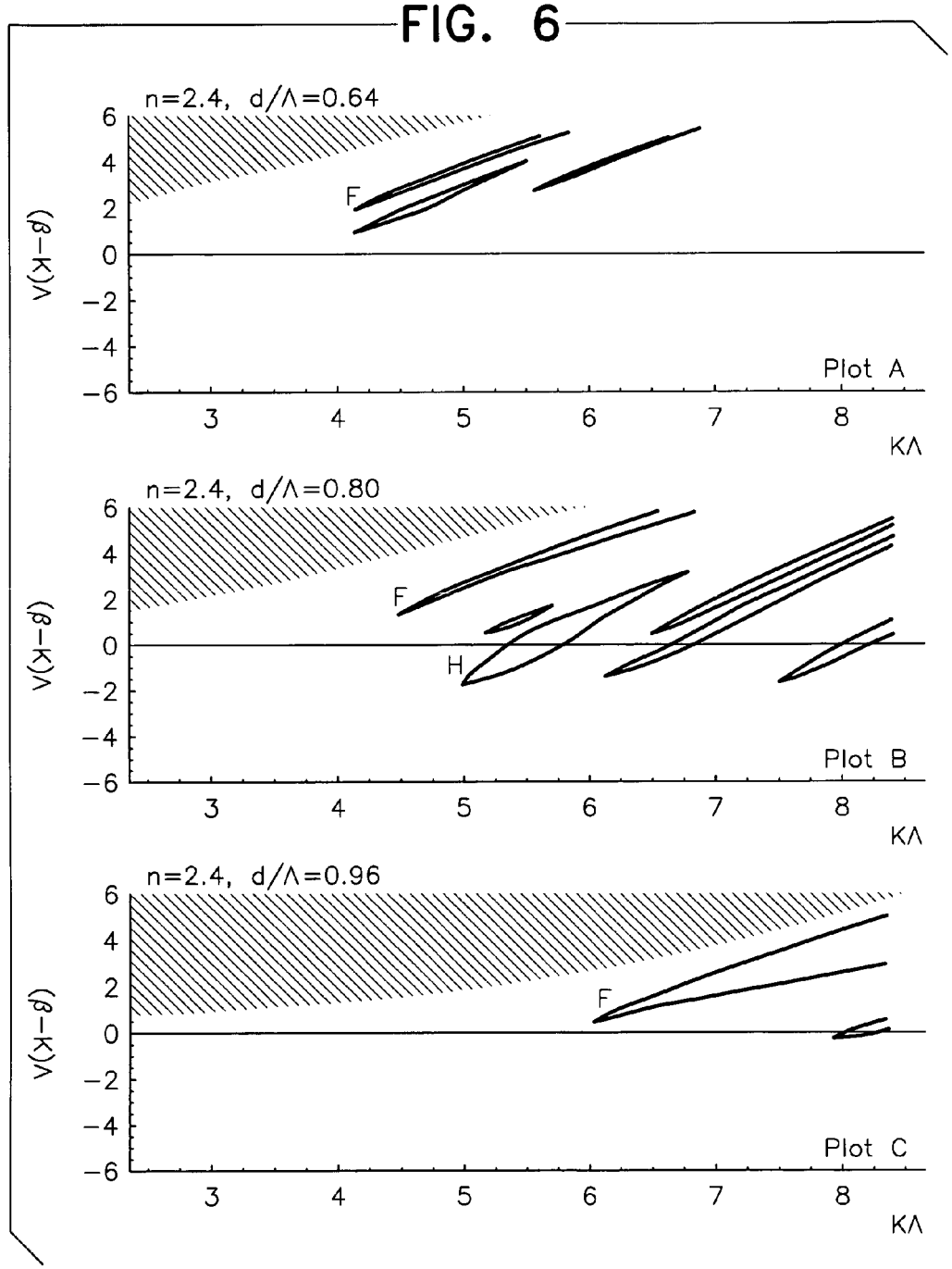

The band-gap structures associated with plots A–C in FIG. 6 have a refractive index contrast of 2.4 and the evolution from plot to plot of the band-gaps is similar to the evolution of the band-gaps in FIG. 5. Plot A in FIG. 6 is associated with a band-gap structure having a value of d/Λ=0.64. Three band-gaps are shown, none of which cross the air line. As such, a respective band-gap fibre could not be arranged to guide light in an air core.

Plot B in FIG. 6, however, which is associated with a band-gap structure having a value of d/Λ=0.80, shows a group of three band-gaps crossing the air line, the lowest frequency band-gap H of which is relatively wide and is found to have an approximate FOM value of 0.0192. This value is even higher than the similar band-gap in plot B of FIG. 5, which has an approximate FOM value of 0.0117.

From plot B, the values estimated for $\beta_H \Lambda$ and $\beta_L \Lambda$ are approximately 6.33 and 4.92 respectively. By substituting these values into Equation 4, the approximate number of air-guided, core modes that could be supported by a respective band-gap fibre is found to be $3.97(r_{CO}/\Lambda)^2$. This value is the same as the value for the band-gap F that crosses the air line in plot C in FIG. 3. Accordingly, a band-gap fibre using this prominent band-gap H could guide an air-guided mode that is spaced, in terms of $\beta$, a significant distance from cladding modes.

Band-gap H in plot B of FIG. 6 has a normalised centre frequency $k_0 \Lambda$ of around 5.56. A fibre using this band-gap could be arranged to guide light at around 1550 nm by having a cladding hole pitch Λ in the region of 1.3 µm. Alternatively, by scaling the structure to have a cladding hole pitch of around 2.7 µm, similar in size to the known prior art structures, the band-gap structure would be able to guide light in the region of 3 µm, which is in the mid-IR.

The next two band-gaps in the group of band-gaps that cross the air line in plot B of FIG. 4 have approximate FOM values of 0.0013 and 0.0015 respectively. Although significantly smaller than the value for the band-gap H, both of these band-gaps may also find practical application in band-gap fibres.

Plot C, which is associated with a band-gap structure having a value of d/Λ=0.96, shows only a single, relatively small band-gap crossing the air line and having an approximate FOM value of 0.002. Band-gap F no longer crosses the air line at this value of d/Λ.

Figure 7:
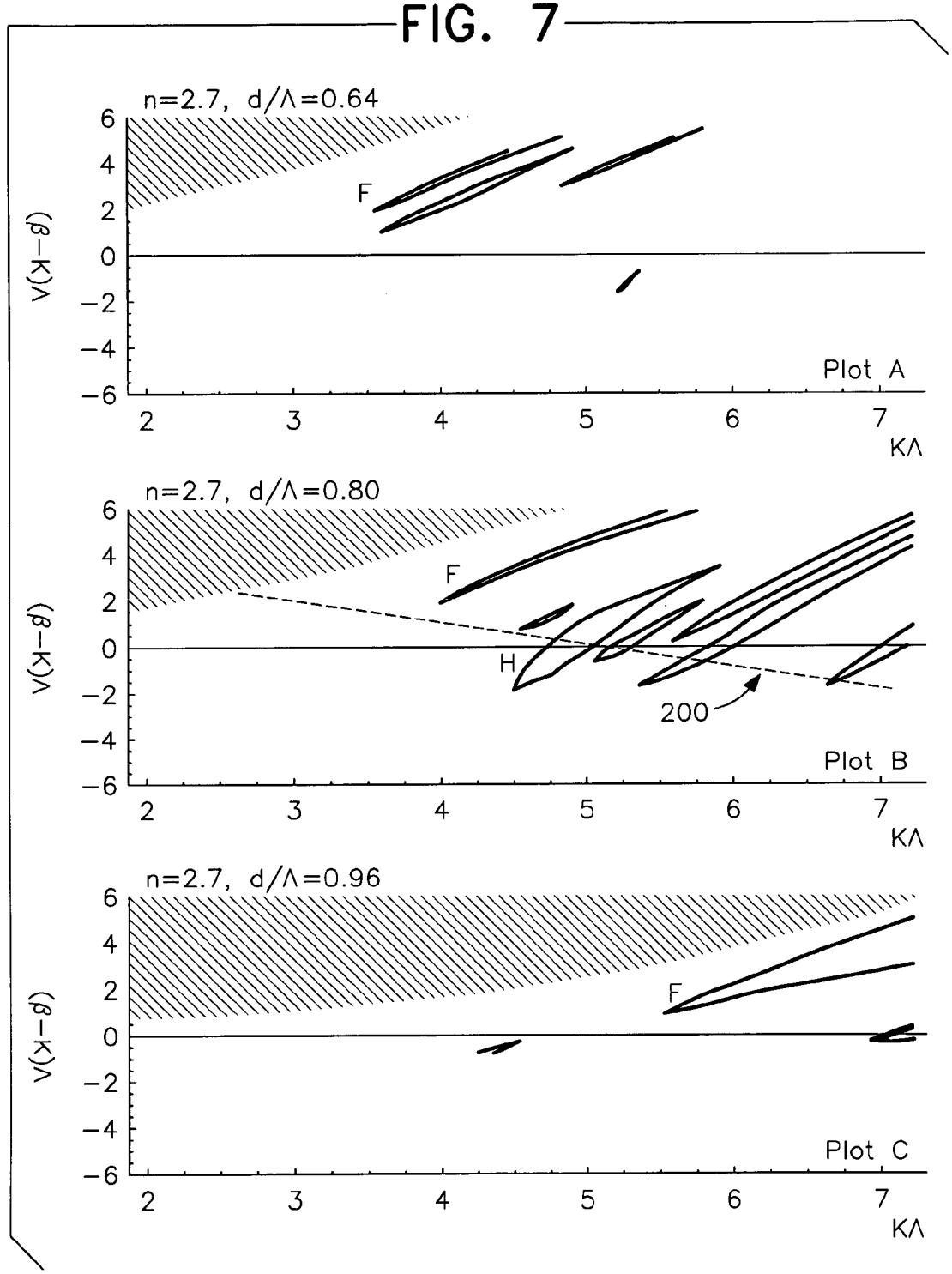

The band-gap structures associated with plots A–C in FIG. 7 have a refractive index contrast of 2.7 and, as shown, the characteristics of the plots are very similar to the respective plots A–C in FIG. 6. In particular, there is a prominent band-gap H crossing the air line in plot B, which is associated with a structure having a value of d/Λ=0.80. This band-gap has an approximate FOM value of 0.0188, which compares favourably with the similarly wide band-gap in plot B of FIG. 6. The normalised centre frequency $k_0\Lambda$ of the band-gap is about 4.9, which is less than for a refractive index of 2.4. Again, a band-gap fibre using this band-gap could find application as an air-guiding fibre for light in the mid-IR.

The diagonal construction line 200 running from approximately (kΛ=2.5, βΛ=5) to (kΛ=7, βΛ=5) will be discussed hereinafter in association with FIG. 12.

Figure 8:
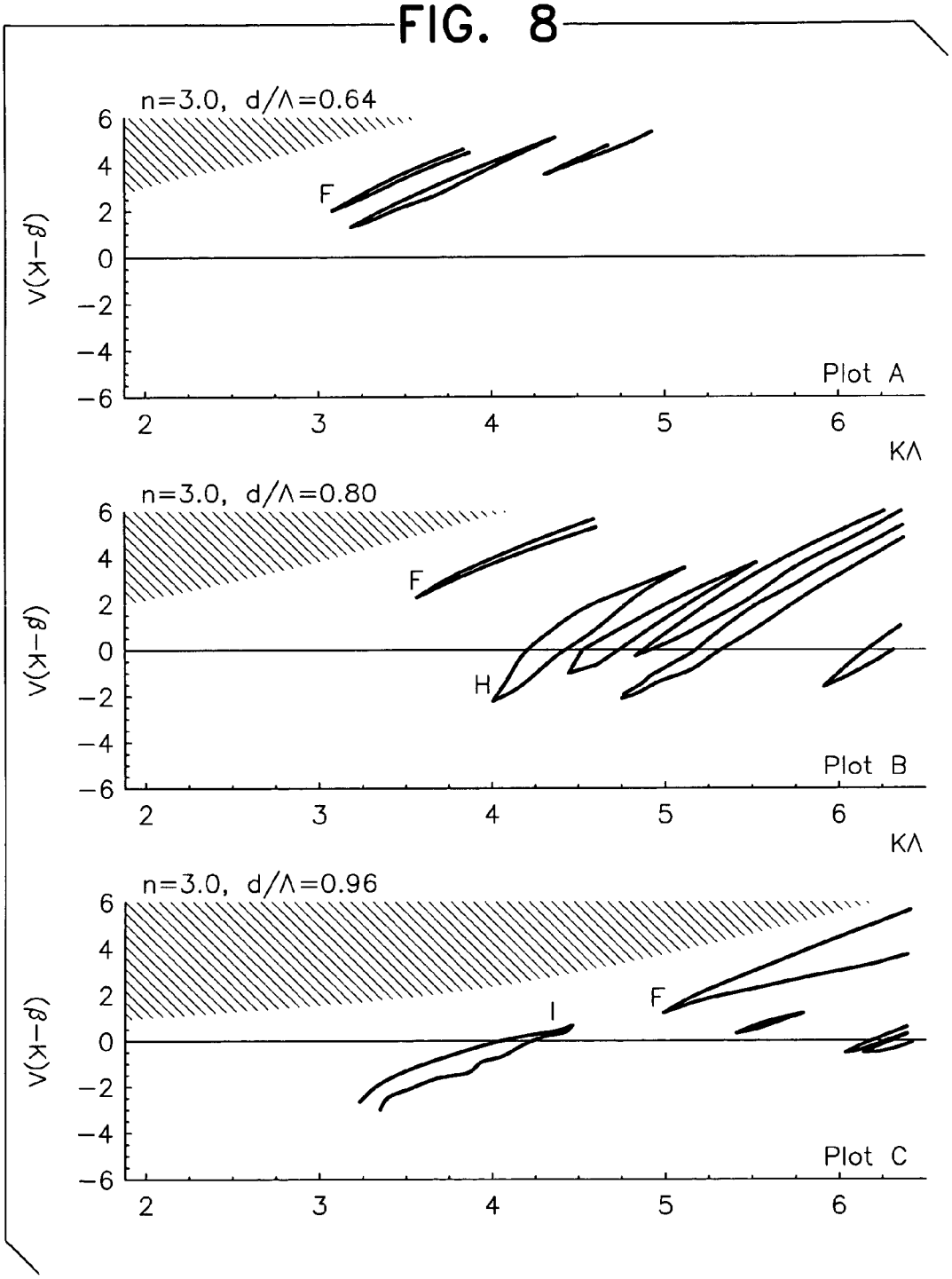

The band-gap structures associated with plots A–C in FIG. 8 have a refractive index contrast of 3.0 and, as shown, the characteristics of the plots are very similar to the plots A–C in FIG. 7. In particular, there is a prominent band-gap H crossing the air line in plot B, which is associated with a structure having a value of d/Λ=0.80. This band-gap has an approximate FOM value of 0.0156, which compares favourably with the similarly wide band-gap in plots B of FIGS. 6 and 7. The normalised centre frequency $k_0\Lambda$ of the band-gap is about 4.4, which is less than for a refractive index of 2.7. A band-gap fibre using this band-gap could find application as an air-guiding fibre for light in the mid-IR.

The band-gap labelled I in plot C of FIG. 8 is believed to be a continuation of an in-plane band-gap, and may be suitable for band-gap fibre guidance if glasses of such a high refractive index were available.

The charts in FIG. 9 summarise how respective band-gaps F and H vary in FOM value with refractive index and value of d/Λ. The FOM values are represented by the areas of the circles that populate the charts. As in the FIGS. 3 to 8, the refractive indices are in the interval 1.5 to 3.0 in steps of 0.3. However, the values of d/Λ are in the interval 0.56 to 0.96 in steps of 0.08. This is a slightly wider and finer range than the plots in FIGS. 3 to 8 and, therefore, the charts identify in more detail how the band-gaps evolve with varying values of d/Λ.

As shown, across each set of plots A–C in FIGS. 3 to 8, the band-gap F evolves as d/Λ increases by increasing in size, and shifting to the right and moving towards the air line. However, for each plot A, B or C over FIGS. 3 to 8, band-gap F becomes less prominent with increasing refractive index contrast. While band-gap F is open over all plots A–C for all refractive index contrasts shown, it only crosses the air line for a small range of refractive index contrasts from 2.1 and lower, as supported by the upper chart in FIG. 9. This implies that the ability for band-gap F to support an air-guided mode is sensitive to both d/Λ and refractive index contrast.

For refractive index contrasts below about 1.8 and d/Λ values in the region of 0.96, however, the band-gap F has relatively large FOM values and may be more favourable than band-gap H for supporting air-guided modes in an air core.

As shown in the lower chart in FIG. 9, band-gap H exists for all refractive index contrasts investigated and crosses the air line over a wide range of values of d/Λ, from 0.64 to 0.96 inclusive.

The lower chart also shows that, for refractive indices of approximately 1.8 and higher, band-gap H appears with highest FOM values at a value of d/Λ=0.80, substantially independently of refractive index. Although it is not possible, by virtue of the granularity of d/Λ values in the lower chart, to determine the exact values of d/Λ that provide the highest FOM values, it is clear that the optimum d/Λ values lie somewhere between 0.72 and 0.88.

For refractive index contrasts above about 1.8, the band-gap H has higher FOM values and may be more favourable than band-gap F for supporting air-guided modes in an air core.

It is apparent from the plots in FIGS. 3 to 8 that, with varying value of d/Λ, the behaviour of the others in the group of higher frequency band-gaps is similar to the behaviour of band-gap H. In particular, the band-gaps in the group all appear open and most prominent at a value of d/Λ=0.8 and are likely to cross the air line for a wide range of values of d/Λ between 0.64 and 0.96.

Overall, it appears that a band-gap fibre that uses any band-gap of the group including band-gap H is likely to be less sensitive to fluctuations in d/Λ value than a similar band-gap fibre that uses band-gap F.

There are a number of other trends evident from the plots in FIGS. 3 to 8. For convenience, the following table summarises approximate characteristic values for band-gap H, at different values of refractive index n, when the value of d/Λ=0.80.

TABLE 1

| n | $k_0\Lambda$ | $h_\omega$ | $h_\beta$ | FOM |
|---|---|---|---|---|
| 1.5 | 10.3 | 0.0291 | 0.0291 | 0.0009 |
| 1.8 | 7.9 | 0.0547 | 0.0839 | 0.0046 |
| 2.1 | 6.5 | 0.0740 | 0.1578 | 0.0117 |
| 2.4 | 5.6 | 0.0758 | 0.2532 | 0.0192 |
| 2.7 | 4.9 | 0.0648 | 0.2903 | 0.0188 |
| 3.0 | 4.4 | 0.0494 | 0.3158 | 0.0156 |

Clearly, the normalised centre frequency $k_0\Lambda$ of the band-gap H decreases as refractive index increases. This has a significant impact on FOM values, which are normalised with respect to normalised centre frequency. Normalised band-gap width $h_\omega$ appears to be at a maximum for a refractive index of about 2.4 and decreases in value for higher and lower refractive indices. Normalised band-gap depth $h_\beta$, however, appears to continue increasing with increasing refractive index. The values of normalised band-gap width and depth provide FOM values having a maximum for a refractive index of about 2.4.

The present inventors suggest that it would be possible to derive the characteristics of a selected band-gap, at least for a triangular lattice, on the basis of the foregoing results. For example, it would be possible to derive the characteristics of a particular band-gap for a structure having a refractive index contrast of 2.2 by interpolating between appropriate values in Table 1. Indeed, the characteristics of the band-gap could probably be estimated simply by considering the clear trends evident in the plots in FIGS. 3 to 8.

The present inventors have, however, gained an increased understanding of the scaling properties of the band-gaps shown in the plots in FIGS. 3 to 8 by considering the scalar wave equation for the field distribution $\Psi(x,y)$ and propagation constant β of a mode.

While the scalar wave equation is, strictly, only valid for small refractive index contrast systems, the present inventors have found that the analysis remains useful for higher refractive index contrast systems, as will now be described.

According to the scalar wave equation, if the refractive index contrast between high and low refractive index regions is sufficiently small, the scalar limit is reached, at which point terms involving $\nabla \ln n^2$ may be neglected (see, for example, Chapter 13 "Weakly Guiding Waveguides" in the book Optical Waveguide Theory, Snyder & Love, Chapman & Hall, ISBN 0 412 24250 8). On this assumption, a number of scaling laws can be derived, as will now be described.

First, if a solution $\Psi$ exists for a particular combination of parameters $\beta$, k, $\Lambda$, $n_1$ and $n_2$, then an identical solution exists for other values of these parameters that combine to give the same values of the normalised parameters $$V^2 = k^2 \Lambda^2 (n_1^2 - n_2^2) \quad \text{Equation 5}$$

and $$W^2 = \beta^2 \Lambda^2 - k^2 \Lambda^2 n_2^2 \quad \text{Equation 6}$$

where $n_1$ is the refractive index of the higher refractive index material and $n_2$ is the refractive index of the lower refractive index material. In other words $W^2$ is a universal function of $V^2$, given a fixed value of $d/\Lambda$ (these values are formally identical to the parameters $V^2$ and $W^2$ familiar for step index fibres, though here they are applied primarily to the modes of the photonic crystal cladding). Thus, for variations in refractive index, Equation 5 gives a scaling law for normalised frequency $k\Lambda$ and Equation 6 gives a scaling law for propagation constant $\beta$.

Of course, in the special case of a glass-air band-gap fibre, in which the lower refractive index material is air, $n_2=1$ and Equations 5 and 6 can be written with $n_1 \to n$. Then, the parameters become $$V^2 = k^2 \Lambda^2 (n^2 - 1) \quad \text{Equation 7}$$

and $$W^2 = (\beta^2 - k^2) \Lambda^2 \quad \text{Equation 8}$$

This implies, in particular, that modes that reside on the air line ($W^2=0$) remain there for all values of n and $\Lambda$.

Therefore, it will be appreciated that, for scalar waves, it is only necessary to produce one band-gap plot $W^2$ versus $V^2$ for a given value of $d/\Lambda$, and use these new scaling laws to deduce $\beta\Lambda$ as a function of $k\Lambda$ for any refractive index. Further, it is apparent that band-gaps that cross the air line for one refractive index also cross the air line for other refractive indices even when the refractive index contrast approaches zero. That an out-of-plane band-gap can remain open even for very low refractive index contrasts is supported by the CLEO 2003 paper described hereinbefore. Of course, as the refractive index contrast approaches zero, it is necessary to increase $\Lambda$, for a given value of k, to remain within the band-gap.

Figure 10:
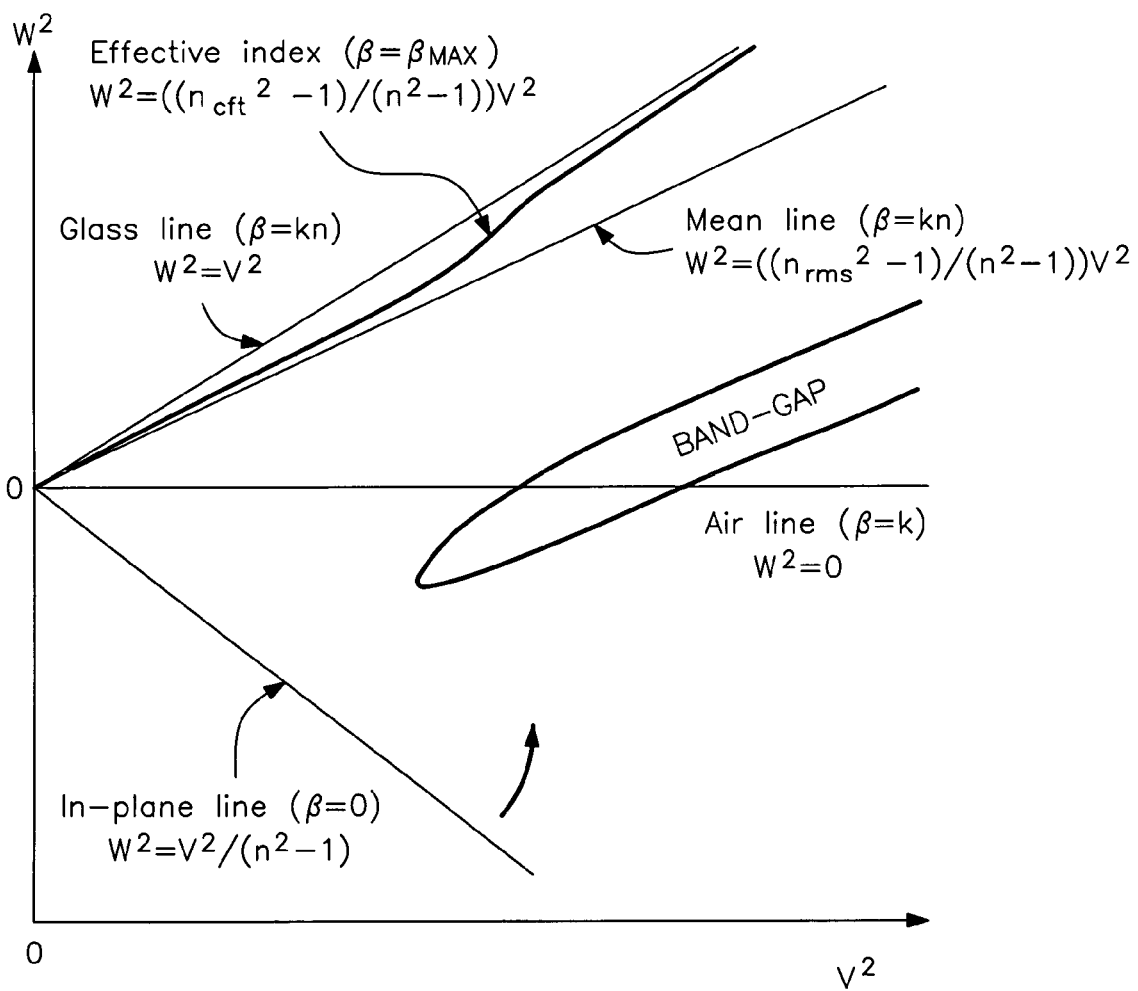
FIG. 10 is a schematic plot of an exemplary band-gap, represented as $W^2$ against $V^2$.

Equations 7 and 8 can be represented graphically according to the schematic graph in FIG. 10, which plots $W^2$ against $V^2$.

The graph in FIG. 10 shows a band-gap crossing a horizontal air line at $W^2=0$, where $\beta=k$. The graph also shows an 'in plane' line ($\beta=0$), a glass line ($\beta=kn$), a mean line ($\beta=kn_{rms}$) and an effective refractive index line ($\beta=\beta_{MAX}$), which defines the maximum $\beta$ for a cladding having a given effective refractive index. The graph illustrates that, at short wavelengths, the effective refractive index line is close to the glass line and, at long wavelengths, the effective refractive index line is close to the mean line. An arrow above the in-plane line indicates that, as the refractive index increases, the slope of the in-plane line decreases since the in-plane line rotates, with a centre of rotation at the origin, towards the air line. When n increases enough for the in-plane line to cross the lower tip of the band-gap, there is an in-plane band-gap. If the in-plane line rotates still further towards the air line, so that the perpendicular between it and the line $W^2=0$ lies entirely within the band-gap, there is an omni-directional band-gap.

For a given value of $d/\Lambda$, it is possible to plot on a graph similar to the one in FIG. 10 the entire band structure of a photonic crystal applicable for all values of refractive index. The only substantial effect on the graph of varying refractive index is to change the slope of the in-plane line.

It will be appreciated that the preceding analysis, which is based entirely on scalar waves, would not be expected to define exactly what happens in practical air-glass systems in which light has vector components. Furthermore, the scaling laws cannot predict the existence of a band-gap, only how a band-gap scales when it does exist. On this basis, it is expected that real band-gap plots, generated for different refractive indices in a glass-air system, should exhibit some variations, which are due only to the vector nature of the field. For example, as the refractive index changes, there are likely to be small shifts in $\beta$ values that differ between different polarisations of the same spatial mode (similar to the splitting that occurs between the $TE_{01}$, $HE_{21}$ and $TM_{01}$ modes of a step index fibre as the step index increases for fixed V). This is expected to have the effect of slightly reducing the width of a band-gap, which is predicted on the basis of the purely scalar case, if the prediction is for a high refractive index glass and is made on the basis of the band-gap for a low refractive index glass.

Figure 11:
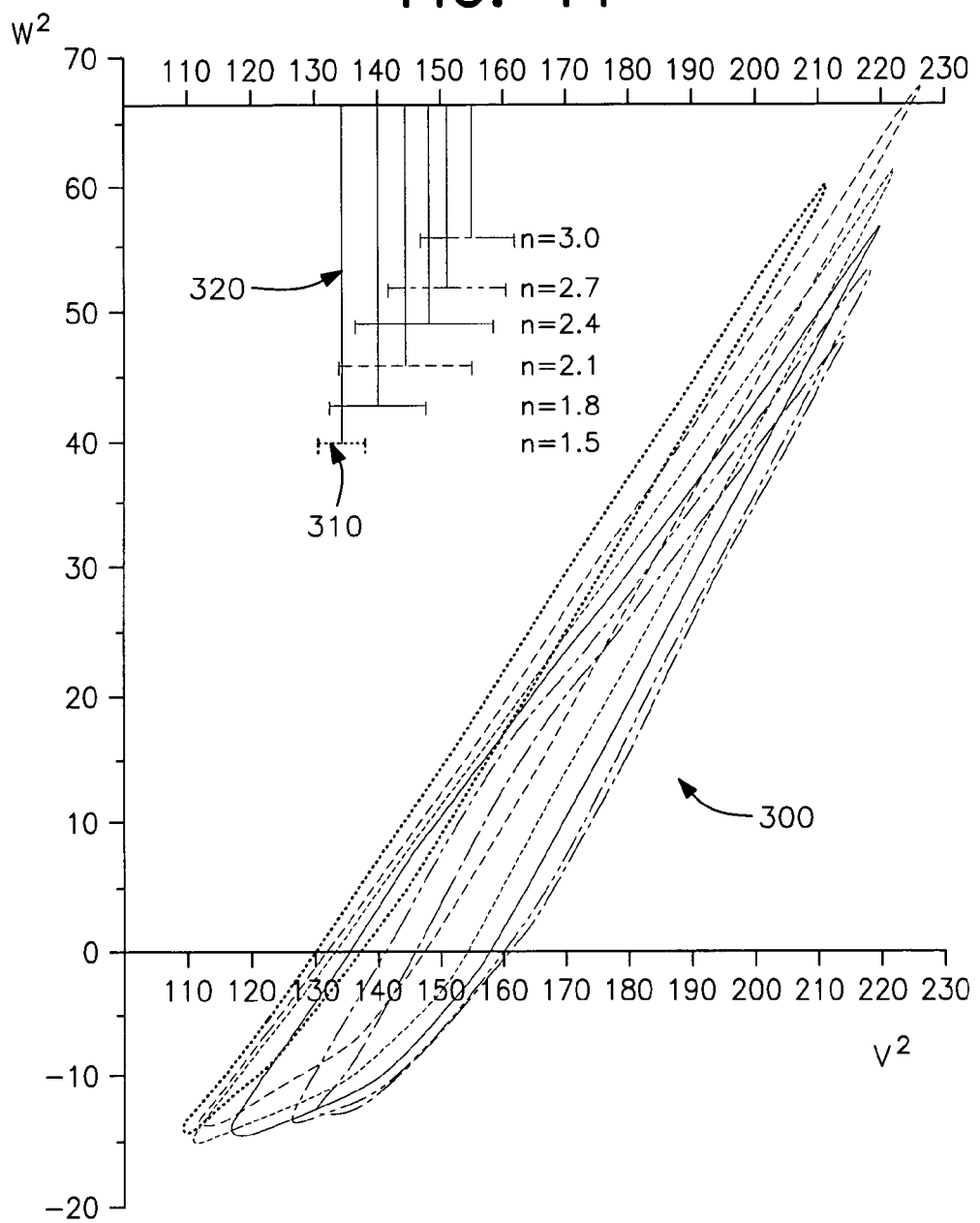
FIG. 11 is a plot, represented as $W^2$ against $V^2$, which illustrates how an exemplary band-gap evolves over a range of refractive index contrasts.

FIG. 11 shows plural band-gaps H 300, near the air line, plotted as $W^2$ versus $V^2$, using full vector calculations for a value of $d/\Lambda=0.8$ and a range of different refractive indices from 1.5 to 3.0, in steps of 0.3. As can be seen, the band-gaps for different refractive indices are clearly very closely grouped together, which indicates that the scalar scaling laws provide a close approximation to the position of the band-gap plots for real band-gaps in practical band-gap fibres. As predicted, the band-gaps are not exactly aligned with one another and the band-gaps appear to shift slightly to the right as their respective refractive indices increase.

The graph includes horizontal bars 310, which represent the approximate $V^2$ position and width of each respective band-gap at $W^2=0$, on the air line. Each dimension bar has an associated vertical projection line 320, which identifies the centre $V^2$ value $V_0^2$ for each band-gap.

The trend in the graph in FIG. 11 is that $V_0^2$ increases from approximately 130 to 160 in a refractive index interval of approximately 1.5 to 3.0. At the most favourable FOM values for band-gap H, for refractive indices in the approximate range 2.1 to 2.7, the $V_0^2$ values are in the approximate range 140 to 155. At a refractive index of 2.4, the $V_0^2$ value is between 145 and 153.

It is apparent that the foregoing scaling laws are a useful tool for designing band-gap fibres with reduced mathematical calculations. The scaling laws, in addition, provide significant insight into the properties of band-gaps and how they vary with varying refractive index.

Figure 12:
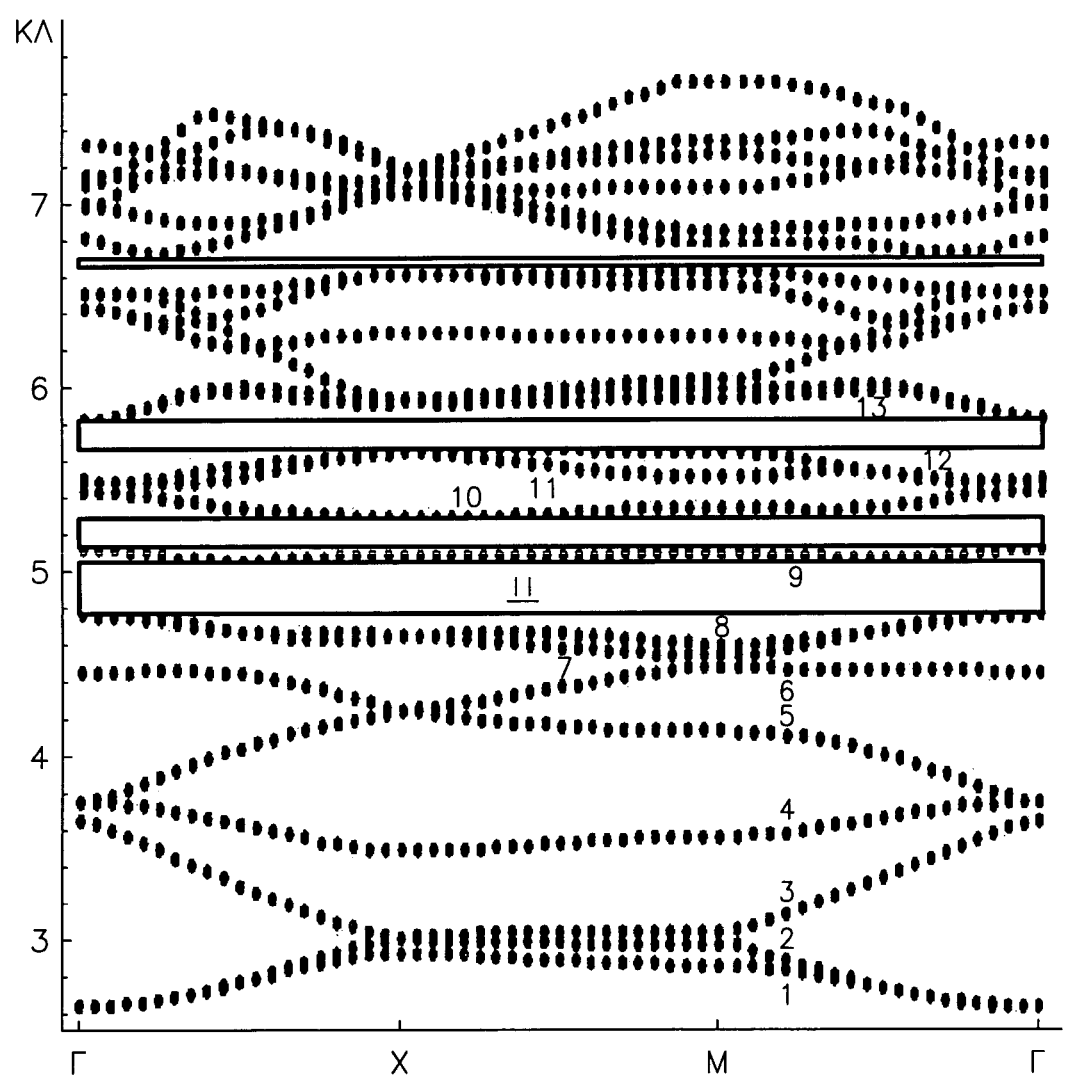
FIG. 12 is a band diagram of an exemplary photonic band-gap structure.

A band diagram for an exemplary band-gap fibre, according to an embodiment of the present invention, is plotted in FIG. 12. The band diagram is plotted for a value of $\beta\Lambda=5.0$ and a refractive index contrast of 2.7. The band diagram corresponds to the diagonal construction line in plot B in FIG. 7.

It is apparent that the band-gap F, which appears in many of the plots in FIGS. 3 to 8, is not open for the value of βΛ plotted in FIG. 12. However, as has already been stated, band-gap F resides between bands four and five for triangular lattice structures.

In contrast, the band-gap H, which has been shown herein to be associated with values of d/Λ in the region of 0.8, is seen to reside between bands eight and nine, as shown in FIG. 12. The band diagram in FIG. 12 shows bands numbered from 1 to 13 and the band diagram in FIG. 13 shows in more detail the band-gaps between bands 8 and 10.

Although the band diagram for only one band-gap structure has been plotted in FIG. 12, the present inventors have found that, when band-gap H is present, it occurs between bands eight and nine for all refractive indices that have been investigated. The other, higher-frequency band-gaps, which are prominent at values of d/Λ in the region of 0.8, generally occur above band nine. For example, the next two of the higher order band-gaps occur between bands nine and ten and bands twelve and thirteen respectively.

Figure 13:
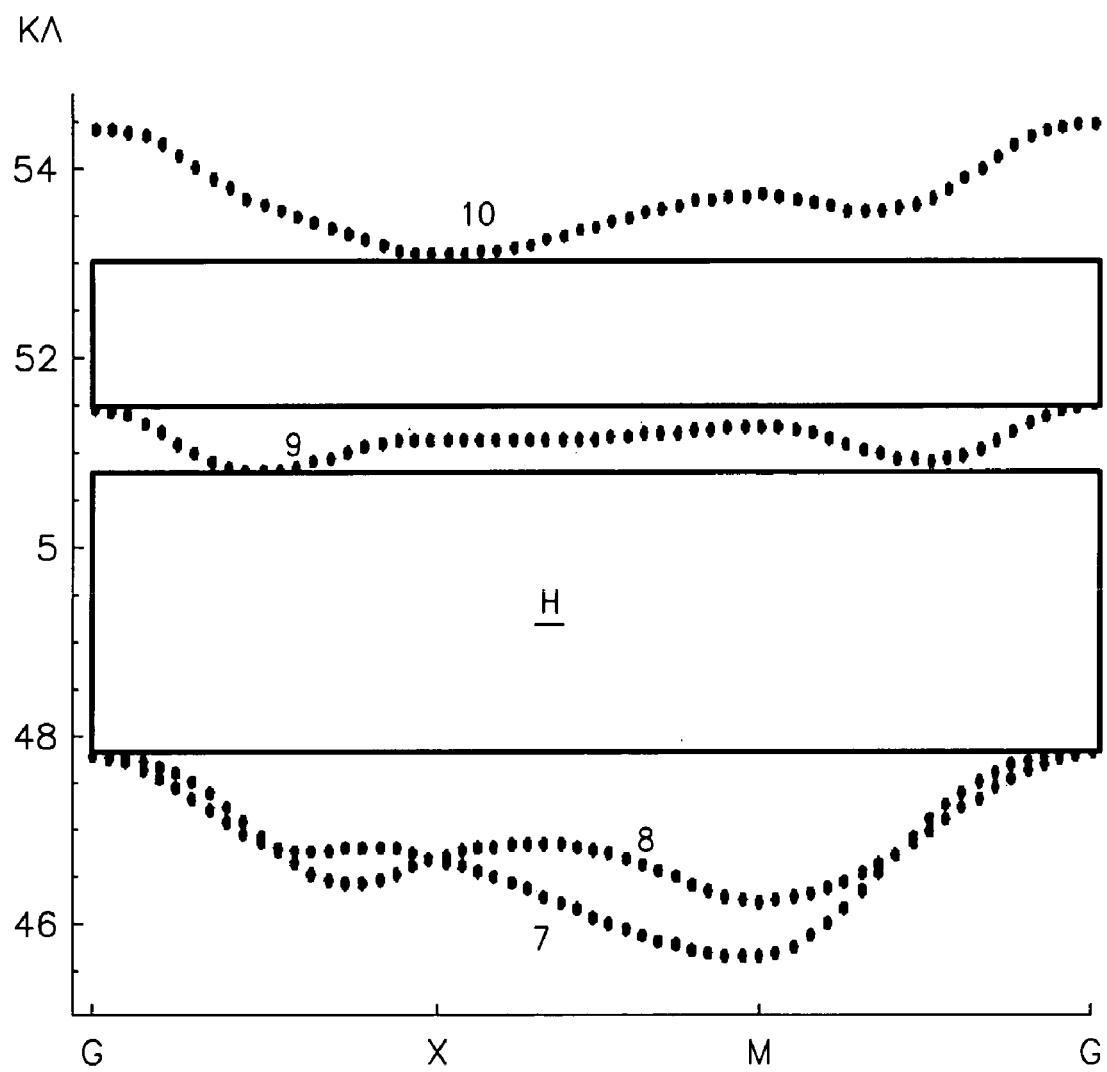
FIG. 13 is a magnified portion of the band diagram of FIG. 12.

It is seen from FIG. 13 that the band-gap H is indirect. In other words, the position in the Brillouin Zone of the maximum of the eighth band is not vertically aligned with the position of the minimum of ninth band. Furthermore, surprisingly, the minimum of the latter band occurs away from the high symmetry points (Γ, X, M); it is found instead to reside along the symmetry line ΓX within the Brillouin Zone (the entire Zone has been explored). The indirect nature of the band-gap can act to suppress loss inducing scattering mechanisms which carry low momentum within the plane of periodicity. Furthermore, an indirect gap can also imply that the decay into the cladding of the field associated with a band-gap guided mode in a waveguide structure is more rapid for a given band-gap width. Thus a smaller number of cladding periods may be needed to sufficiently confine the light.

A band structure of the kind shown in FIGS. 12 and 13 can be computed by known computational methods, for example as described in Appendix D of "Photonic Crystals: Molding the Flow of Light", by Joannopoulos et al., Princeton University Press, ISBN 0 691 03744 2.

The band-gap structures considered thus far have had round holes. The present inventors have identified that some of the band-gaps associated with a band-gap structure can be highly sensitive to hole cross-sectional shape while other band-gaps are not.

Figure 15A:
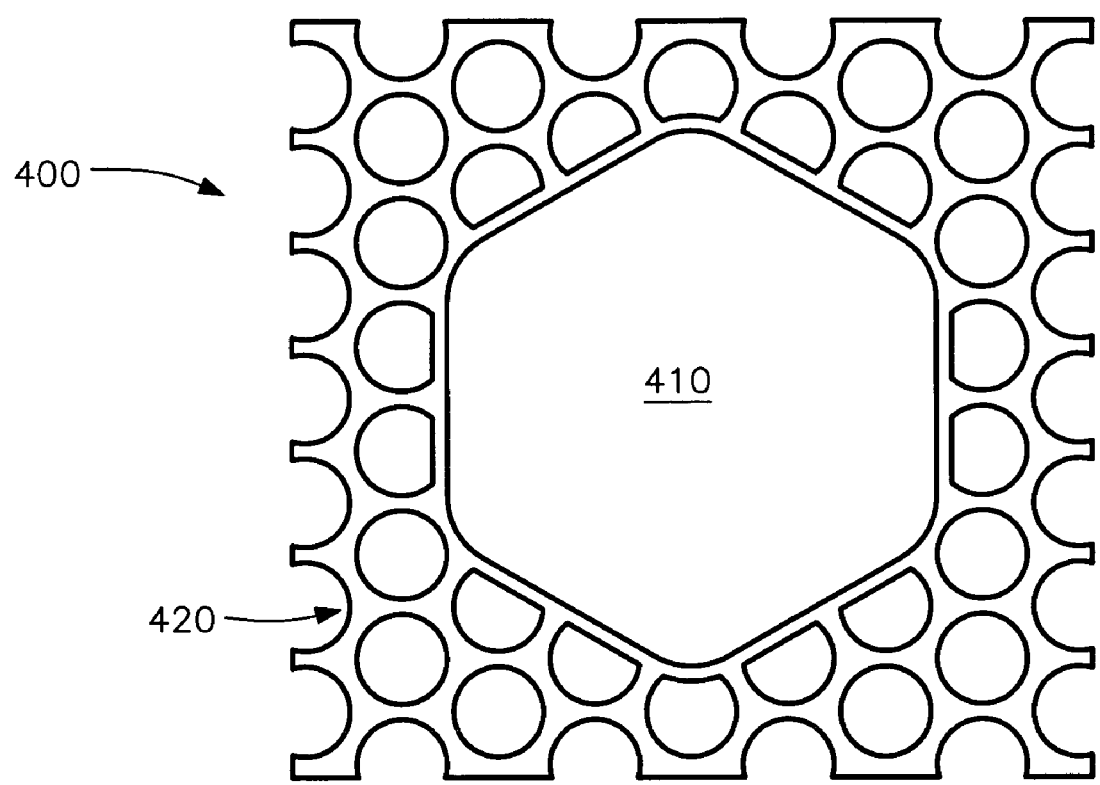
FIGS. 15 to 17 are diagrams of the transverse cross sections of three different exemplary 19-cell band-gap fibre structures, each comprising a solid matrix material defining a triangular lattice of elongate holes, accompanied by respective mode plots.
Figure 16A:
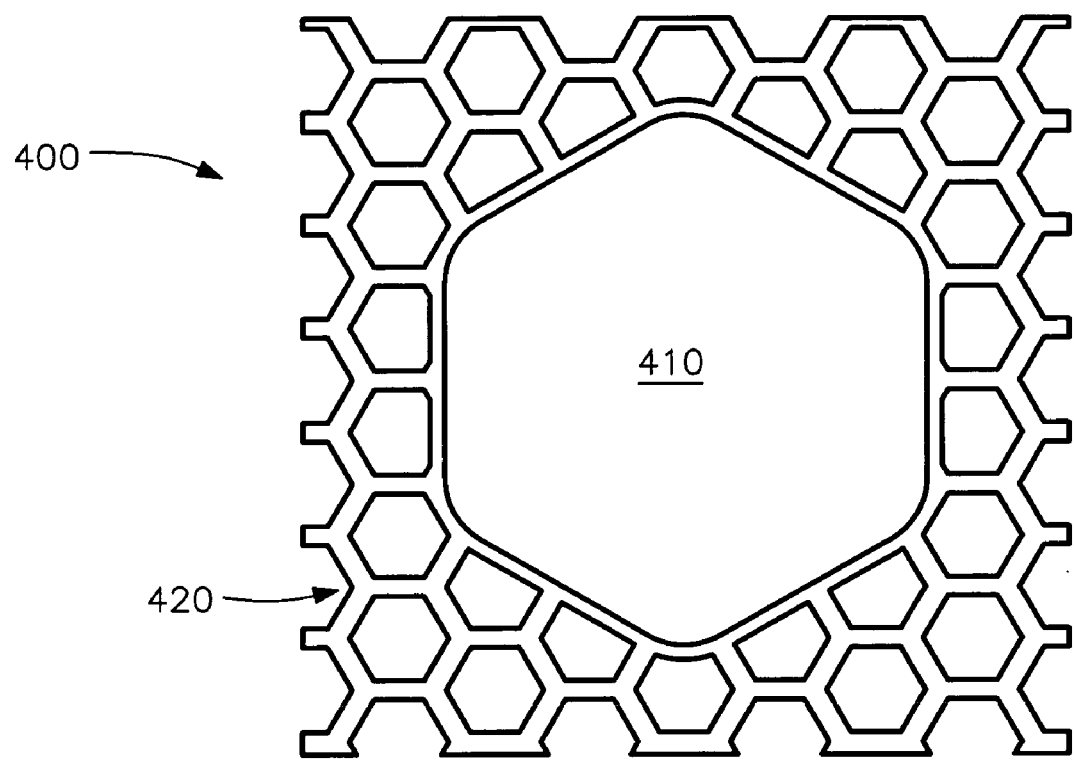
Figure 17A:
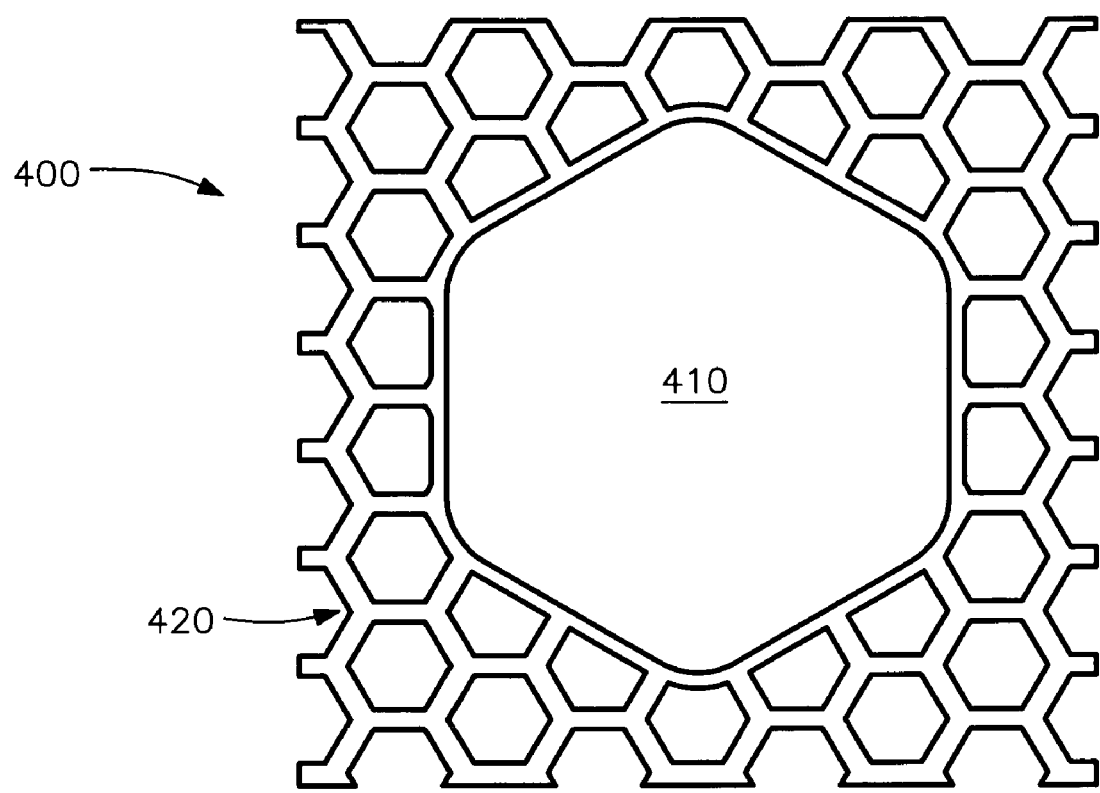

Plots A–C in FIG. 14, which are similar to those plots already shown in FIGS. 3 to 8, were generated using the cladding structures illustrated in the diagrams in FIGS. 15a, 16a and 17a respectively. The cladding structures include holes defined by a glass having a refractive index of 2.4. The only characteristics that change between plots are hole shape and the value of d/Λ, which is varied only to maintain a constant AFF value of 0.58 for each cladding structure.

Plot A shows the band-gaps for round holes (and is in fact the same as plot B in FIG. 6), Plot B shows the band-gaps for hexagonal holes with rounded corners and plot C shows the band-gap for hexagonal holes.

A surprising trend shown by the plots in FIG. 14 is that the band-gap H for each structure is substantially unaffected by the change in hole shape in the interval from round to hexagonal. In contrast, band-gap F closes as hole shape tends towards hexagonal. Of possibly even greater significance is the behaviour of the higher frequency band-gaps, above band-gap H, which have been shown to behave in a similar fashion to band-gap H for varying values of d/Λ. These higher-frequency band-gaps also close as hole shape tends towards hexagonal. The present inventors have investigated this phenomenon with refractive indices other than 2.4 and have found the same behaviour.

The trend shown in the plots in FIG. 14 is significant in the design of band-gap fibres. For example, it has been reported in the prior art that structural uniformity in band-gap fibres is important for making low loss fibres. It is clear from the plots in FIG. 14 that a band-gap fibre using band-gap H to guide light in an air core is likely to be less sensitive to fluctuations in cladding hole shape than, say, band-gap F or the higher-order band-gaps. It has already been indicated herein that band-gap H is also likely to be less sensitive to fluctuations in d/Λ value. In addition, if a band-gap fibre designer wishes to design a fibre that has only one band-gap crossing the air line, it might be preferable to use band-gap H and specify cladding holes having a hexagonal cross section.

The diagrams in FIGS. 15a–17a each represent an inner region of an exemplary band-gap fibre structure 400 having a core region 410 surrounded by a micro-structured cladding region 420, only an inner part of which is shown. In practice, the cladding region has sufficient micro-structure, extending outwardly from the core region 410, to confine a required amount of light to the core; where more layers provide increased confinement. A photonic band-gap structure according to embodiments of the present invention also has an over-cladding (not shown), for example comprising a layer of silica glass, which surrounds the micro-structured region. The over-cladding provides mechanical strength. The fibre also has a jacket layer (not shown), around the over-cladding, in order to protect the fibre from handling and the environment.

Each of the exemplary band-gap fibre structures shown in FIGS. 15a, 16a and 17a have 19-cell core defects 410, which are approximately equivalent in size and shape to nineteen unit cells of the cladding region—an inner cell, the six cells surrounding the inner cell and the twelve cells surrounding the six cells. Thus, the diameter of each core is in the region of 5Λ.

Figure 15B:
Figure 16B:
Figure 17B:

FIGS. 15b, 16b and 17b are mode intensity plots of one polarisation of a degenerate mode that is supported by each respective band-gap fibre. Such plots can be generated using the aforementioned Fourier methods.

The modes are each found at an approximate normalised frequency kΛ=5.7 and a propagation constant βΛ=5.6. The amount of light of each mode found to be in air, in the core and cladding holes, is approximately 96%. The plots show that the modes have a predominantly Gaussian form, with central peaks, which decay rapidly towards the core boundaries of the band-gap structures. This indicates that a significant amount of the light is confined to the core region of each band-gap fibre. There also appears to be some light trapped in the glass around the core region, but the level of this light appears to be relatively low.

The mode plots indicate that variations in cladding hole cross-sectional shape should not materially affect a fundamental mode that is supported by a respective band-gap fibre.

The cladding parameters for an exemplary, practical glass-air band-gap fibre, which is suitable for guiding mid-IR light in an air core, will now be described. A suitable glass has a refractive index of 2.4, which is attainable with a chalcogenide glass of appropriate composition. By reference to the plots in FIG. 6, a suitable cladding arrangement comprises a triangular lattice of round air holes, having a d/Λ value of 0.8. From Table 1, the normalised centre frequency $k_0\Lambda$ of band-gap H for such a cladding is approximately 5.6, which implies the that for guiding mid-IR light at a wavelength of approximately 3.5 μm, the cladding pitch Λ is approximately 3 μm and the cladding hole diameter is approximately 2.4 μm. Additionally, the core has a diameter of approximately 2Λ, or 6 μm.

The core-guided modes closest to the air line have been calculated using the aforementioned Fourier methods and are shown in the plots in FIG. 18. The plots represent the axial Poynting-vector profiles of the selected modes calculated using an 8Λ×8Λ super-cell in conjunction with an FFT grid size of 512×512. The Poynting-vector magnitude is normalised to unity over a super-cell.

Each plot is annotated with its propagation constant $\beta\Lambda$. The modes at $\beta\Lambda=5.735$ and $\beta\Lambda=4.104$ represent the edges of the band-gap where a significant amount of light appears to be in the glass of the cladding structure; all other modes are gap-states that are localised in or near to the central defect. The modes can be characterised as being either 'surface states', for example the modes at $\beta\Lambda=5.550$ or $\beta\Lambda=4.882$, or as air-guided states, for example the pair of degenerate fundamental-like modes at $\beta\Lambda=5.041$.

Optical fibres according to embodiments of the present invention can be made using known processes involving forming a pre-form, which has the desired fibre structure on a macro scale, and drawing down a fibre from the pre-form in a standard fibre drawing tower. A suitable pre-form may be made by a known stack-and-draw or extrusion process. The particular process chosen will be appropriate for the selected glass, or other material, being used to make the fibre.

Figure 19:
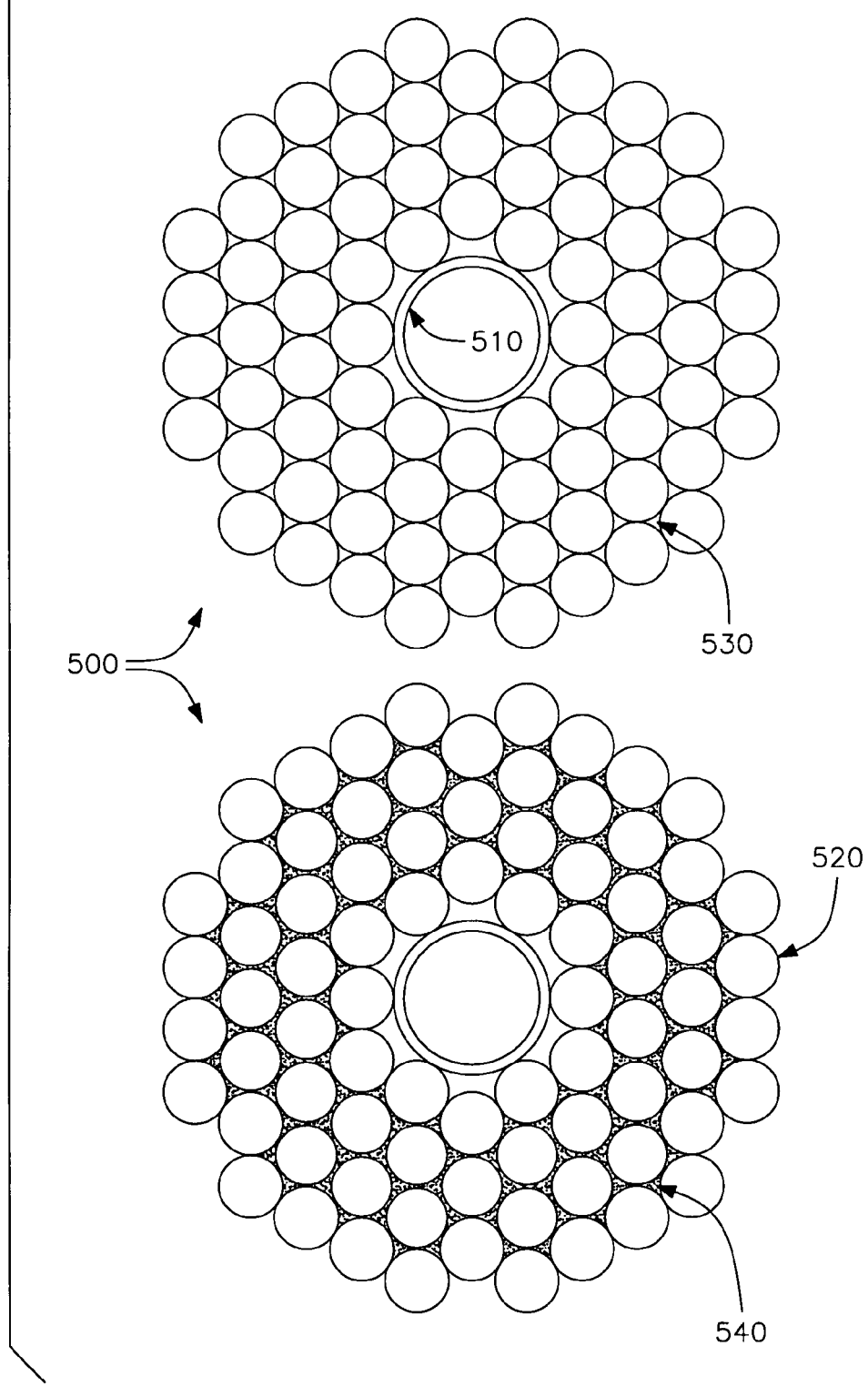
FIG. 19 shows a diagram of two alternative, exemplary band-gap fibre pre-forms suitable for making band-gap fibres according to embodiments of the present invention.

The diagrams in FIG. 19 illustrate two possible pre-form arrangements 500 for forming band-gap fibres according to embodiments of the present invention. The pre-form arrangements 500 share in common a relatively large central glass tube 510, which becomes a core region of a drawn fibre. Stacked around the large central glass tube is a triangular array of smaller glass tubes 520, which fuse and become the band-gap structure, or cladding region, of the drawn fibre. As can be seen, in these pre-form arrangement examples, the central glass tube 510 replaces seven of the smaller tubes 520, which leads to a fibre having a seven-cell defect. Obviously, use of a larger diameter central glass tube and omission of an additional layer of smaller glass tubes would enable formation of a 19-cell defect instead.

The pre-form arrangements 500 differ with respect to the treatment of interstitial voids 530 that arise naturally between the smaller glass tubes in the stacks.

In the upper pre-form arrangement, the interstitial voids 530 are empty. The impact of this is that, during fibre drawing, the voids close due to surface tension in the glass and the resulting fibre has cladding holes that have a substantially hexagonal shape in their transverse cross section.

In the lower pre-form arrangement, the interstitial voids are packed with round cross-section glass rods 540. The impact of this is that the resulting fibre has cladding holes that have a substantially round shape in their transverse cross section.

The skilled person would be able to calculate the required thickness of the walls of the tubes in FIG. 19, in order to achieve a required value of d/Λ in a fibre, with due regard to the draw-down ratio of the pre-form to the fibre, the pressures applied to the core and cladding holes (to counteract surface tension in the glass and keep the holes open during drawing) and conservation of material principles during the fibre drawing process.

Although the exemplary embodiments described herein typically relate to periodic band-gap fibre structures having a glass matrix defining air holes in the cladding and core, it will be appreciated that the principles disclosed relate to other, possibly non-periodic, band-gap structures in which the matrix material may not be glass, for example it may be a polymer, and the holes could instead be filled with gases other than air, liquids or solids, which may have a refractive index higher or lower than the matrix material.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

The invention claimed is:

1. An elongate waveguide for guiding light comprising:
   a core, comprising an elongate region of relatively low refractive index; and
   a photonic band-gap structure that surrounds the core and is arranged to provide a photonic band-gap that can substantially confine light to the core, the structure comprising elongate regions of relatively low refractive index interspersed with elongate regions of relatively high refractive index,
   wherein, the band-gap resides above the fifth photonic band of the band-gap structure.

2. The waveguide of claim 1, wherein the band-gap resides above the eighth photonic band of the band-gap structure.

3. The waveguide of claim 1, wherein the band-gap resides between the eighth and ninth photonic bands of the band-gap structure.

4. The waveguide of claim 1, wherein the photonic band-gap structure provides a number of additional photonic band-gaps.

5. The waveguide of claim 4, wherein the photonic band-gap has a higher figure of merit than any one of the additional photonic band-gaps (if any) that is able to substantially confine light to the core.

6. The waveguide of claim 4, wherein the photonic band-gap is the lowest-order band-gap that is able to substantially confine light to the core.

7. The waveguide of claim 4, wherein any additional band-gap that resides below the fifth band of the band-gap structure is unable to substantially confine light to the core.

8. The waveguide of claim 7, wherein any additional band-gap that resides between the fourth and fifth bands of the band-gap structure is unable to substantially confine light to the core.

9. The waveguide of claim 1, wherein a refractive index contrast between the relatively high refractive index and the relatively low refractive index is at least 1.5.

10. The waveguide of claim 1, wherein at least an inner region of the core has a refractive index substantially equal to one.

11. The waveguide of claim 1, wherein at least some of the relatively low refractive index regions have a refractive index substantially equal to one.

12. The waveguide of claim 1, wherein the band-gap is arranged to confine to the core light having a wavelength of at least 1.55 μm.

13. The waveguide of claim 1, wherein the relatively high refractive index regions are substantially transparent to light having a wavelength of at least 1.55 μm.

14. The waveguide of claim 1, wherein the photonic band-gap structure comprises a fraction by volume of relatively low refractive index regions lower than 0.8.

15. The waveguide of claim 1, wherein the photonic band-gap structure comprises a fraction by volume of relatively low refractive index regions between 0.50 and 0.80.

16. The waveguide of claim 1, wherein the photonic band-gap structure comprises a lattice having a lattice pitch $\Lambda$.

17. The waveguide of claim 16, wherein the photonic band-gap structure comprises a triangular lattice of unconnected relatively low refractive index regions having a characteristic transverse dimension d.

18. The waveguide of claim 17, wherein the photonic band-gap structure has a ratio of d/$\Lambda$, where $0.72 \leq d/\Lambda \leq 0.88$.

19. The waveguide of claim 1, wherein the photonic band-gap structure has a value $V_0^2$ (as defined herein), where $130 \leq V_0^2 \leq 160$.

20. The waveguide of claim 17, wherein the photonic band-gap has a normalised centre frequency $k_0\Lambda$ (as defined herein) in the range $5 \leq k_0\Lambda \leq 6$, when d/$\Lambda$=0.8 and the refractive index contrast is 2.4, or a normalised centre frequency $k_0\Lambda$, of the same photonic band-gap, that is scaled with either or both d/$\Lambda$ and refractive index contrast between the relatively high refractive index and the relatively low refractive index.

21. The waveguide of claim 1, wherein the regions of relatively low refractive index have a substantially round cross section with a cross sectional diameter d.

22. The waveguide of claim 1, wherein the regions of relatively low refractive index have a substantially hexagonal cross section with a cross sectional dimension d.

23. An elongate waveguide for guiding light comprising:
a core, comprising an elongate region of relatively low refractive index; and
a photonic band-gap structure that surrounds the core and is arranged to provide a photonic band-gap that can substantially confine light to the core, the structure comprising elongate regions of relatively low refractive index interspersed with elongate regions of relatively high refractive index,
characterised by the photonic band-gap having a value of $V_0^2$ (as defined herein) in the range $130 \leq V_0^2 \leq 160$.

24. The waveguide of claim 23, wherein the photonic band-gap resides above the fifth photonic band of the band-gap structure.

25. The waveguide of claim 23, wherein the band-gap resides above the eighth photonic band of the band-gap structure.

26. The waveguide of claim 23, wherein the band-gap resides between the eighth and ninth photonic bands of the band-gap structure.

27. The waveguide of claim 23, wherein the photonic band-gap structure comprises a triangular lattice, having a lattice pitch $\Lambda$.

28. The waveguide of claim 23, wherein the photonic band-gap structure comprises a triangular lattice of unconnected relatively low refractive index regions having a characteristic transverse dimension d.

29. The waveguide of claim 28, wherein the photonic band-gap structure has a ratio of d/$\Lambda$, where $0.72 \leq d/\Lambda \leq 0.88$.

30. An elongate waveguide for guiding light comprising:
a core, comprising an elongate region of relatively low refractive index; and
a photonic band-gap structure that surrounds the core and is arranged to provide a photonic band-gap that can substantially confine light to the core, the structure comprising a lattice of spaced apart elongate regions of relatively low refractive index embedded in a relatively high refractive index matrix, the lattice having a lattice pitch $\Lambda$ and the elongate regions of relatively low refractive index having a transverse dimension d,
characterised by the photonic band-gap having a normalised centre frequency $k_0\Lambda$ (as defined herein) in the range $5 \leq k_0\Lambda \leq 6$, when d/$\Lambda$=0.8 and the refractive index contrast is 2.4, or a normalised centre frequency $k_0\Lambda$, of the same photonic band-gap, that is scaled with either or both d/$\Lambda$ and refractive index contrast between the relatively high refractive index and the relatively low refractive index.

31. A method of operating the elongate, light-guiding waveguide claimed in claim 1, the method being characterised by the step of coupling into the waveguide light having a wavelength which is substantially confined to the core by the photonic band-gap.

32. A method of forming an elongate waveguide comprising the steps of:
selecting an operating wavelength of light for the waveguide;
generating a design for a waveguide having a core, comprising an elongate region of relatively low refractive index, and a photonic band-gap structure that surrounds the core and is arranged to provide a photonic band-gap, above the fifth photonic band of the band-gap structure, that can substantially confine light, having the selected operating wavelength, to the core, the structure comprising elongate regions of relatively low refractive index interspersed with elongate regions of relatively high refractive index; and manufacturing the elongate waveguide according to the design.

33. Use of the elongate waveguide claimed in claim 1 including coupling into the waveguide light having a wavelength which is substantially confined to the core by the photonic band-gap.

* * * * *